United States Patent
Silverstein et al.

(10) Patent No.: US 7,959,297 B2
(45) Date of Patent: Jun. 14, 2011

(54) UNIFORM SPECKLE REDUCED LASER PROJECTION USING SPATIAL AND TEMPORAL MIXING

(75) Inventors: Barry D. Silverstein, Rochester, NY (US); Gary E. Nothhard, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 429 days.

(21) Appl. No.: 12/121,185

(22) Filed: May 15, 2008

(65) Prior Publication Data

US 2009/0284713 A1     Nov. 19, 2009

(51) Int. Cl.
G03B 21/00        (2006.01)

(52) U.S. Cl. ............. 353/31; 353/30; 353/32; 353/33; 353/34; 353/37; 353/38; 353/81; 353/94; 353/98; 353/99; 353/119; 372/50.1; 372/50.121; 372/50.11; 372/50.12; 372/108; 372/34; 372/35; 372/36; 359/629; 359/634; 359/636; 359/637; 359/638; 359/639; 359/640; 349/7; 349/8; 349/9

(58) Field of Classification Search ............... 353/30, 353/31, 32, 33, 34, 37, 38, 81, 94, 98, 99, 353/119; 359/629, 634, 636, 637, 638, 639, 359/640; 372/50.1, 50.121, 50.11, 50.12, 372/108, 34, 35, 36; 349/7, 8, 9; 348/51
See application file for complete search history.

(56) References Cited

U.S. PATENT DOCUMENTS

| | | |
|---|---|---|
| 4,978,197 A | 12/1990 | Horikawa |
| 6,124,973 A | 9/2000 | Du et al. |
| 6,183,092 B1 * | 2/2001 | Troyer .......................... 353/31 |
| 6,186,629 B1 * | 2/2001 | Iwamura et al. ................. 353/31 |
| 6,240,116 B1 * | 5/2001 | Lang et al. .................. 372/50.12 |
| 6,377,410 B1 | 4/2002 | Wang et al. |
| 6,445,487 B1 | 9/2002 | Roddy et al. |
| 6,577,429 B1 | 6/2003 | Kurtz et al. |
| 6,600,590 B2 | 7/2003 | Roddy et al. |

(Continued)

FOREIGN PATENT DOCUMENTS

EP        1 292 134 A2     3/2003

(Continued)

OTHER PUBLICATIONS

Riechert et al., Far-Field Nonmodal Laser Emission for Low-Speckle Laser Projection, IEEE Photonics Technology Letters, vol. 21, No. 20, Oct. 15, 2009.*

(Continued)

*Primary Examiner* — Georgia Y Epps
*Assistant Examiner* — Sultan Chowdhury
(74) *Attorney, Agent, or Firm* — Kevin E. Spaulding

(57) ABSTRACT

A digital image projector includes a light assembly configured to project light along a light path from at least one laser array light source, the projected light having an overlapping far field illumination in a far field illumination portion of the light path; a temporally varying optical phase shifting device configured to be in the light path; an optical integrator configured to be in the light path; a spatial light modulator located downstream of the temporally varying optical phase shifting device and the optical integrator in the light path, the spatial light modulator configured to be located in the far field illumination portion of the light path; and projection optics located downstream of the spatial light modulator in the light path, the projection optics configured to direct substantially speckle free light from the spatial light modulator toward a display surface.

20 Claims, 16 Drawing Sheets

U.S. PATENT DOCUMENTS

| | | | |
|---|---|---|---|
| 6,625,381 B2 | 9/2003 | Roddy et al. | |
| 6,747,781 B2 | 6/2004 | Trisnadi | |
| 6,975,294 B2 | 12/2005 | Manni et al. | |
| 7,322,704 B2* | 1/2008 | Shchegrov | 353/94 |
| 7,325,929 B2* | 2/2008 | Yavid et al. | 353/31 |
| 7,360,899 B2* | 4/2008 | McGuire et al. | 353/20 |
| 7,422,329 B2* | 9/2008 | Berman | 353/20 |
| 2002/0114057 A1 | 8/2002 | Roddy et al. | |
| 2002/0196414 A1 | 12/2002 | Manni et al. | |
| 2004/0104902 A1* | 6/2004 | Fujii et al. | 345/204 |
| 2004/0207823 A1 | 10/2004 | Alasaarela et al. | |
| 2005/0128586 A1 | 6/2005 | Sedlmayr | |
| 2005/0219469 A1* | 10/2005 | Chan et al. | 353/31 |
| 2007/0139769 A1 | 6/2007 | DeCusatis et al. | |
| 2009/0096991 A1 | 4/2009 | Chien et al. | |
| 2009/0122272 A1 | 5/2009 | Silverstein et al. | |
| 2009/0141242 A1 | 6/2009 | Silverstein et al. | |
| 2009/0284713 A1* | 11/2009 | Silverstein et al. | 353/8 |
| 2010/0321478 A1* | 12/2010 | Sliwa et al. | 348/51 |

FOREIGN PATENT DOCUMENTS

| | | |
|---|---|---|
| EP | 1 463 337 A2 | 9/2004 |
| EP | 1 734 771 A1 | 12/2006 |
| EP | 2 003 484 A1 | 12/2008 |
| EP | 2 043 211 A2 | 4/2009 |
| JP | 2002323675 | 11/2002 |
| JP | 2002344050 | 11/2002 |
| WO | WO 01/06297 A2 | 1/2001 |
| WO | 200231575 | 4/2002 |
| WO | WO 2005/063433 A1 | 7/2005 |
| WO | WO 2008/039961 A2 | 4/2008 |

OTHER PUBLICATIONS

Jahja I. Trisnadi: "Speckle Contrast Reduction In Laser Projection Displays", Proceedings of the SPIE—The International Society for Optical Engineering, SPIE, P.O. Box 10, Bellingham, WA 98227-0010 USA, vol. 4657, Jan. 1, 2002, pp. 131-137, XP002329078, ISSN: 0277-786X, p. 132.

"Perceived Speckle Reduction in Projection Display Systems", IBM Technical Disclosure Bulletin, IBM Corp. New York, USA, vol. 40, No. 7, Jul. 1, 1997, pp. 9-11, XP000728388, ISSN: 0018-8689, the whole document.

* cited by examiner

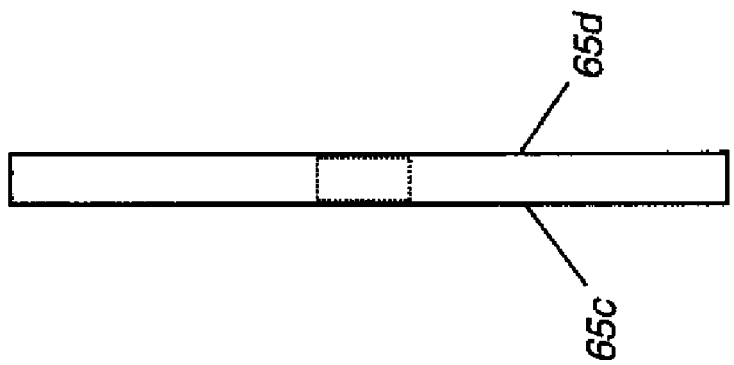
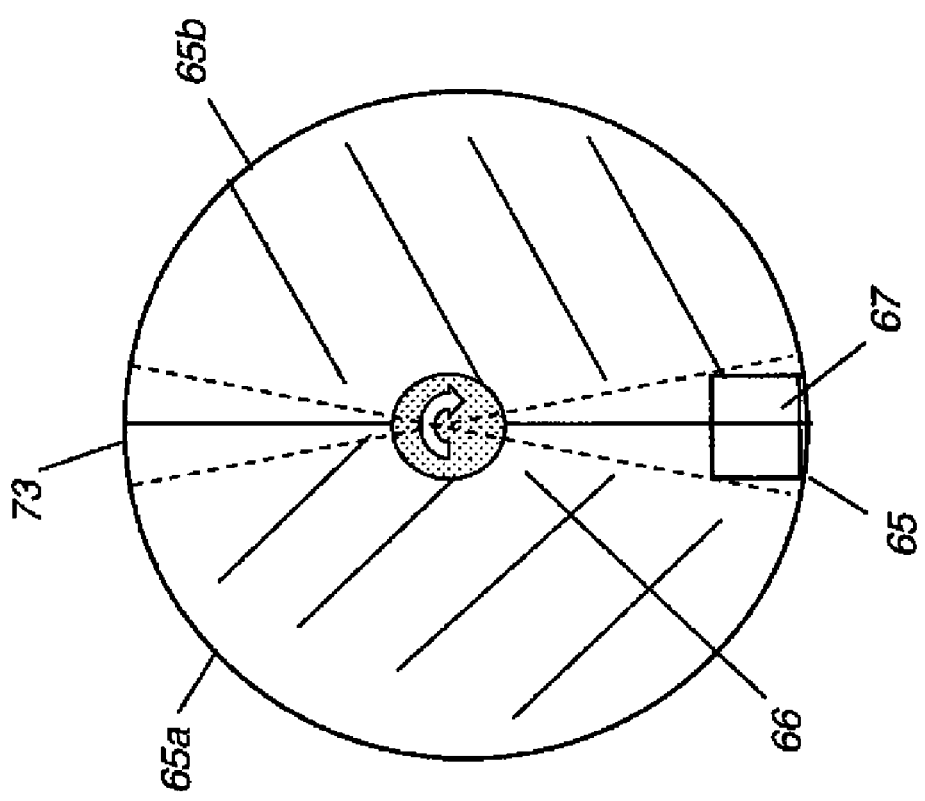

UNIFORM SPECKLE REDUCED LASER PROJECTION USING SPATIAL AND TEMPORAL MIXING

CROSS REFERENCE TO RELATED APPLICATIONS

The present invention is related to the commonly assigned U.S. patent "STEREO PROJECTION USING POLARIZED SOLID STATE LIGHT SOURCES" filed Feb. 25, 2008 by Silverstein et al., Ser. No. 12/036,385.

FIELD OF THE INVENTION

This invention generally relates to an apparatus for projecting a digital image and more particularly relates to an improved apparatus and method using polarized lasers to create uniform and essentially speckle free images for digital cinema projection.

BACKGROUND OF THE INVENTION

There is growing interest in high-quality digital projection systems that display images that can match or surpass the quality of film especially in large venues. The most promising of these digital projection solutions for multicolor digital cinema projection employ, as image forming devices, one of two basic types of spatial light modulators (SLMs). The first type of spatial light modulator is the Digital Light Processor (DLP) a digital micromirror device (DMD), developed by Texas Instruments, Inc., Dallas, Tex. DLPs have been successfully employed in digital projection systems. DLP devices are described in a number of patents, for example U.S. Pat. No. 4,441,791; U.S. Pat. No. 5,535,047; U.S. Pat. No. 5,600,383 (all to Hornbeck).

FIG. 1 shows a simplified block diagram of a projector apparatus 10 that uses DLP spatial light modulators. A light source 12 provides polychromatic unpolarized light into a prism assembly 14, such as a Philips prism, for example. Prism assembly 14 splits the polychromatic light into red, green, and blue component wavelength bands and directs each band to the corresponding spatial light modulator 20r, 20g, or 20b. Prism assembly 14 then recombines the modulated light from each SLM 20r, 20g, and 20b and provides this unpolarized light to a projection lens 30 for projection onto a display screen or other suitable surface.

DLP-based projectors demonstrate the capability to provide the necessary light throughput, contrast ratio, and color gamut for most projection applications from desktop to large cinema. However, there are inherent resolution limitations, with existing devices typically providing no more than 2048× 1080 pixels. In addition, high component and system costs have limited the suitability of DLP designs for higher-quality digital cinema projection. Moreover, the cost, size, weight, and complexity of the Philips prism or other suitable combining prisms are significant constraints. In addition, the need for a relatively fast projection lens with a long working distance, due to brightness requirements, negatively impacts the acceptability and usability of these devices.

The second type of spatial light modulator used for digital projection is the LCD (Liquid Crystal Device). The LCD forms an image as an array of pixels by selectively modulating the polarization state of incident light for each corresponding pixel. LCDs appear to have some advantages as spatial light modulators for high-quality digital cinema projection systems. These advantages include relatively large device size, favorable device yields and the ability to fabricate higher resolution devices, for example 4096×2160 resolution devices available from Sony and JVC Corporations. Among examples of electronic projection apparatus that utilize LCD spatial light modulators are those disclosed in U.S. Pat. No. 5,808,795 (Shimomura et al.) and elsewhere. LCOS (Liquid Crystal On Silicon) devices are thought to be particularly promising for large-scale image projection. However, with LCD components it can be difficult to maintain the high quality demands of digital cinema, particularly with regard to color and contrast, since the high thermal load of high brightness projection affects polarization qualities of these devices.

A continuing problem with illumination efficiency relates to etendue or, similarly, to the Lagrange invariant. As is well known in the optical arts, etendue relates to the amount of light that can be handled by an optical system. Potentially, the larger the etendue, the brighter the image. Numerically, etendue is proportional to the product of two factors, namely the image area and the numerical aperture. In terms of the simplified optical system represented in FIG. 2 having light source 12, optics 18, and a spatial light modulator 20, etendue is a product of the area of the light source A1 and its output angle $\theta 1$ and, in a well-matched optical system, this is equal to the product of the area of the modulator A2 and its acceptance angle $\theta 2$. For increased brightness, it is desirable to provide as much light as possible from the area of light source 12. As a general principle, the optical design is advantaged when the etendue at the light source is most closely matched to the etendue at the modulator.

Increasing the numerical aperture, for example, increases etendue so that the optical system captures more light. Similarly, increasing the source image size, so that light originates over a larger area, increases etendue. In order to utilize an increased etendue on the illumination side, the etendue must be greater than or equal to that of the illumination source. Larger image sizes, however, typically result in a more costly system. This is especially true of devices such as LCOS and DLP components, where the silicon substrate and defect potential increase with size. As a general rule, increased etendue results in a more complex and costly optical design. Using a conventional approach such as that outlined in U.S. Pat. No. 5,907,437 (Sprotbery et al.) for example, lens components in the optical system must be designed for large etendue. The source image area for the light that must be converged through system optics is the sum of the combined areas of the spatial light modulators in red, green, and blue light paths; notably, this is three times the area of the final multicolor image formed. That is, for the configuration disclosed in such a conventional approach, optical components handle a sizable image area, therefore a high etendue, since red, green, and blue color paths are separate and must be optically converged. Moreover, although a configuration such as that disclosed in the '437 Sprotbery et al. disclosure handles light from three times the area of the final multicolor image formed, this configuration does not afford any benefit of increased brightness, since each color path contains only one-third of the total light level.

Efficiency improves when the etendue of the light source is well-matched to the etendue of the spatial light modulator. Poorly matched etendue means that the optical system is either light-starved, unable to provide sufficient light to the spatial light modulators, or inefficient, effectively discarding a substantial portion of the light that is generated for modulation.

The goal of providing sufficient brightness for digital cinema applications at an acceptable system cost has eluded designers of both LCD and DLP systems. LCD-based systems have been compromised by the requirement for polarized light, reducing efficiency and increasing etendue, even where polarization recovery techniques are used. DLP device designs, not requiring polarized light, have proven to be somewhat more efficient, but still require expensive, short lived lamps and costly optical engines, making them too expensive to compete against conventional cinema projection equipment.

In order to compete with conventional high-end film-based projection systems and provide what has been termed electronic or digital cinema, digital projectors must be capable of achieving comparable cinema brightness levels to this earlier equipment. As some idea of scale, the typical theatre requires on the order of 10,000 lumens projected onto screen sizes on the order of 40 feet in diagonal. The range of screens requires anywhere from 5,000 lumens to upwards of 40,000 lumens. In addition to this demanding brightness requirement, these projectors must also deliver high resolution (2048×1080 pixels) and provide around 2000:1 contrast and a wide color gamut.

Some digital cinema projector designs have proved to be capable of this level of performance. However, high equipment cost and operational costs have been obstacles. Projection apparatus that meet these requirements typically cost in excess of $50,000 each and utilize high wattage Xenon arc lamps that need replacement at intervals between 500-2000 hours, with typical replacement cost often exceeding $1000. The large etendue of the Xenon lamp has considerable impact on cost and complexity, since it necessitates relatively fast optics to collect and project light from these sources.

One drawback common to both DLP and LCOS LCD spatial light modulators (SLM) has been their limited ability to use laser light sources, particularly laser sources. Although they are advantaged over other types of light sources with regard to relative spectral purity and potentially high brightness levels, laser light sources require different approaches in order to use these advantages effectively. Conventional methods and devices for conditioning, redirecting, and combining light from color sources, used with earlier digital projector designs, can constrain how well laser light sources are used.

Solid-state lasers promise improvements in etendue, longevity, and overall spectral and brightness stability but, until recently, have not been able to deliver visible light at sufficient levels and at costs acceptable for digital cinema. In a more recent development, laser arrays have been commercialized and show some promise as potential light sources. However, brightness itself is not yet high enough; the combined light from as many as 9 individual arrays is needed in order to provide the necessary brightness for each color.

Laser arrays of particular interest for projection applications include various types of VCSEL arrays, including VECSEL (Vertical Extended Cavity Surface-Emitting Laser) and NECSEL (Novalux Extended Cavity Surface-Emitting Laser) devices from Novalux, Sunnyvale, Calif. However, conventional solutions using these devices have been prone to a number of problems. One limitation relates to device yields. Due largely to heat and packaging problems for critical components, the commercialized VECSEL array is extended in length, but limited in height; typically, a VECSEL array has only two rows of emitting components. The use of more than two rows tends to increase yield difficulties dramatically. In addition, conventional VECSEL designs are prone to difficulties with power connection and heat sinking. These lasers are of high power; for example, a single row laser device, frequency doubled into a two-row device by Novalux, produces over 3 W of usable light. Thus, there can be significant current requirements and heat load from the unused current. Lifetime and beam quality is highly dependent upon stable temperature maintenance.

Coupling of the laser sources to the projection system presents another difficulty that is not adequately addressed using conventional approaches. For example, using Novalux NECSEL lasers, approximately nine 2 row by 24 laser arrays are required for each color in order to approximate the 10,000 lumen requirement of most theatres. It is desirable to separate these sources, as well as the electronic delivery and connection and the associated heat from the main thermally sensitive optical system to allow optimal performance of the projection engine. Other laser sources are possible, such as conventional edge emitting laser diodes. However, these are more difficult to package in array form and traditionally have a shorter lifetime at higher brightness levels.

The use of laser sources in general presents its own set of imaging artifacts. The primary artifacts of concern are that of laser speckle and illumination uniformity.

Speckle is a fine scale spatially varying intensity fluctuation that is caused by random roughness of surfaces on the order of a wavelength of light. The increased coherence of lasers introduces a significant effect in projection systems where the roughness creates randomly phased sub-sources interfering together. This random intensity fluctuation lowers the effective MTF of an image, especially at the higher frequencies essentially producing a "shimmer effect" in detail, but also creating an intensity sharpness that is really artificial. The phenomenon of speckle has been studied in detail by many researchers and a comprehensive summary of knowledge has been published by Joseph Goodman, *Speckle Phenomena in Optics, Theory and Application*, Roberts and Company, Greenwood Village, Colo. (2007). Goodman indicates that full frame displays should at least have the standard deviation intensity variation less than that of the least significant bit of the intensity resolution of the modulation device. For Digital Cinema applications this control is at 12 bits and contrast ratios of around 2000:1 are common. Other cinema standards lean toward different criteria, indicating that speckle "should not be visible", this can be quantitatively assumed to have the level of speckle to be equivalent to that of a white light projector on a common screen. This has been measured to be around 3% peak to valley variation in intensity.

Goodman has characterized some common approaches to reducing speckle in display applications:
  "1. Introduce polarization diversity;
  2. Introduce a moving screen;
  3. Introduce a specially designed screen that minimizes the generation of speckle;
  4. For each color, broaden the spectrum of the sources or use multiple lasers at slightly different frequencies, thereby achieving wavelength diversity in the illumination;
  5. For each color, use multiple independent lasers separated spatially, thereby achieving angle diversity in the illumination;
  6. Overdesign the projection optics as compared with the resolution of the eye;
  7. Image a changing diffuser with random phase cells onto the screen; and
  8. Image a changing diffuser with deterministic or orthogonal phase codes onto the screen."

Each of these approaches has some benefits as well as negative attributes. Some of these apply well for high-end digital cinema projection, while others do not. In addition, in many cases a single approach may not be effective enough to reduce the speckle below acceptable thresholds. Polarization diversity is not desirable in many cases, as any projector that requires polarization either to modulate the light or to create stereoscopic imaging cannot allow impure states to reach the viewer. Specially designed screens and screen shaking can be effective, however, they require modification to the venue that is undesirable, as being able to show a quality on any screen is preferred. Similarly, if a polarization maintaining screen is desired adding additional constraints or features may be prohibitively expensive or difficult. Large screens are especially difficult to modify manufacturing processes, as the equipment is large and expensive.

Spectrally broadening may be desirable, however, this may be difficult to control in the laser fabrication, as many methods of creating visible solid state sources desired for display applications use frequency double crystals that control the wavelength to around 1 nm. Multiple independent lasers are a very good approach, but, such an approach depends on the number of elements used to control the speckle. This does not work well over the range of low light level to high light level projection system, as a 1000 lumen projector needs to be as speckle free as a 10,000 lumen projector, yet the number of sources may be 10 times as high. For example, Mooradian et al, "High Power Extended Vertical Cavity Surface Emitting Diode Lasers and Arrays And Their Applications", Micro-Optics Conference, Tokyo, Japan, Nov. 2, 2005, discloses the improved speckle performance in Novalux Extended Cavity Surface Emitting Lasers (NECSELS). In this case 30 to 40 independent (incoherent to each other) emitters reduced the speckle down to several percent. While the speckle is reduced with a larger number of emitters it is not always reduced to white light levels required by the stringent digital cinema requirements.

Changing diffusers is very effective, however, this increases the etendue of the sources by creating additional angular extent and requires a relatively expensive and controlled surface treatment on a glass surface in order to be durable for high-powered systems.

In U.S. Pat. No. 7,296,987 Mooradian et al., discloses individual and combined techniques to reduce laser speckle similar to those described by Goodman. First, increasing the number of lasers that are substantially incoherent with respect to each other is used. Second, spectral broadening of the lasers may be used. (This latter technique is also described in U.S. Pat. No. 6,975,294 by Manni et al.) Third, individual lasers in an array may be designed to operate with multiple frequency, phase, and directional (angular) distributions. Finally, an optical element may be used to scramble the direction, phase and polarization information. As described earlier, although increasing the number of lasers is effective at reducing speckle, it is, however, an incomplete solution. The additional methods described in this patent are difficult to implement, expensive or undesirable optically.

U.S. Pat. No. 7,244,028 by Govorkov et al., describes the use of at least one laser delivering a laser beam to a scanning means that increases the laser beam divergence temporally into a lens that delivers the light to a beam homogenizer that illuminates a spatial light modulator. This reduces the laser speckle to acceptable levels when combined with a screen that has at least one feature to further reduce speckle. Although temporally varying the laser beam divergence is generally a good means of reducing speckle, it too, however, requires the modification of the screen for complete speckle reduction. This is undesirable for general projection purposes.

U.S. Pat. No. 7,116,017 by Ji et al., describes a specific device consisting of a vibrating mirror in the light path between the laser and the screen. This alone will not reduce speckle to acceptable levels. While U.S. Pat. No. 6,445,487 by Roddy et al. describes methods that use frequency modulation of the lasers and/or in conjunction with a device to deviate the beam angularly in time, this method requires laser modulation that may not be practical or possible for all laser sources. Similarly, the application focuses on using an acousto-optic modulator for angular deviation. These devices are very expensive and can only handle certain laser types and sizes.

Thus, it can be seen that the challenge of providing a color laser projection system having cinema quality nearly speckle free performance in uniformity and brightness has not been met. There is a need for a laser illumination solution that enables uniform speckle free imaging for high-end projection systems.

SUMMARY OF THE INVENTION

The present invention provides a high quality digital projection system having optimized cost, illumination uniformity, efficiency, and brightness, optimal etendue, reduced laser speckle, and a polarized light source for the projection of stereoscopic images.

Some embodiments of the present invention pertain to a digital image projector including a light assembly configured to project light along a light path from at least one laser array light source, the projected light having an overlapping far field illumination in a far field illumination portion of the light path. The digital image projector also includes a temporally varying optical phase shifting device configured to be in the light path, and an optical integrator configured to be in the far field portion of the light path. According to these embodiments, the projector also includes a spatial light modulator located downstream of the temporally varying optical phase shifting device and the optical integrator in the light path. The spatial light modulator is configured to be located in the far field illumination portion of the light path. The projector further includes projection optics located downstream of the spatial light modulator in the light path, the projection optics configured to direct substantially speckle free light from the spatial light modulator toward a display surface.

These and other embodiments, features, and advantages of the present invention will become apparent to those skilled in the art upon a reading of the following detailed description when taken in conjunction with the drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 12A and 12B show front and side views, respectively, for a shutter that reflects light from one side and transmits light from the other;

It is to be understood that the attached drawings are for purposes of illustrating the concepts of the invention and may not be to scale.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figures shown and described herein are provided to illustrate principles of operation according to the present invention and are not drawn with intent to show actual size or scale. Because of the relative dimensions of the component parts for the laser array of the present invention, some exaggeration is necessary in order to emphasize basic structure, shape, and principles of operation.

Embodiments of the present invention address the need for laser projection display with reduced speckle contrast in the image. Embodiments of the present invention additionally provide features that enable alternating orthogonal polarization states that can be used for stereoscopic projection. Embodiments of the present invention take advantage of the inherent polarization of light and independently coherent light that is emitted from a VECSEL laser array or other types of laser light arrays.

Laser arrays are desirable in many ways for use in projection display applications. Multiple lasers offer advantages in that the light generation does not rely on a single device function to operate, thereby increasing the reliability of the device. Independently operating laser devices offer the added advantage of optical diversity. This diversity is of value in reducing the speckle contrast in a display system. In many projection systems, as discussed earlier, it is possible to utilize polarization and wavelength diversity for this purpose. In some of the embodiments disclosed herein, there is a desire to maintain the inherent polarization states of the lasers. While a small amount of wavelength diversity can be useful it is also difficult and costly to control. This wavelength diversity can be accepted in the embodiments as an additional source of speckle reduction, but is not relied upon within in a single spectral range (red, green, or blue) to obtain the needed speckle reduction.

Figure 1:
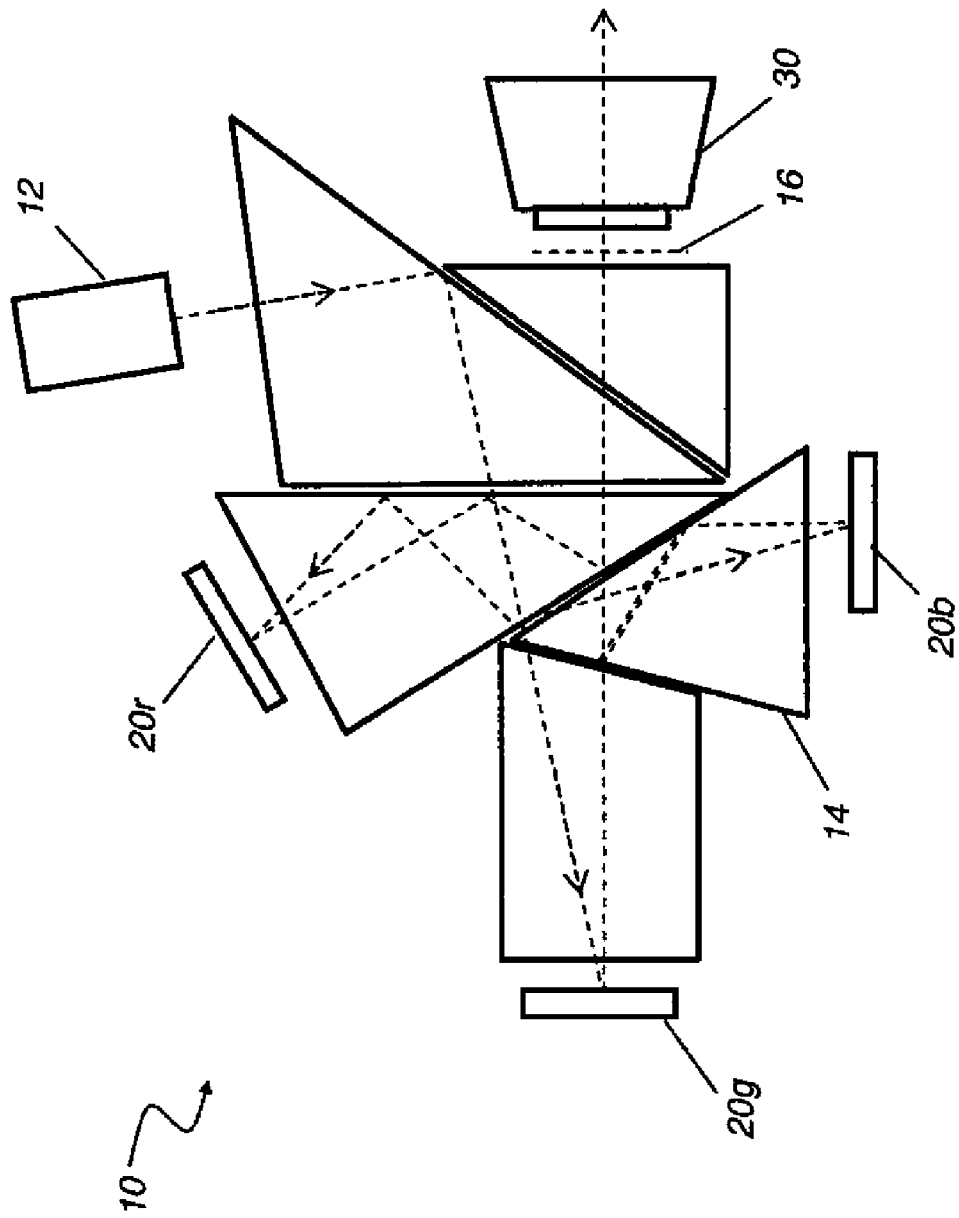
FIG. 1 is a schematic block diagram of a conventional projection apparatus using a combining prism for the different color light paths.
Figure 2:
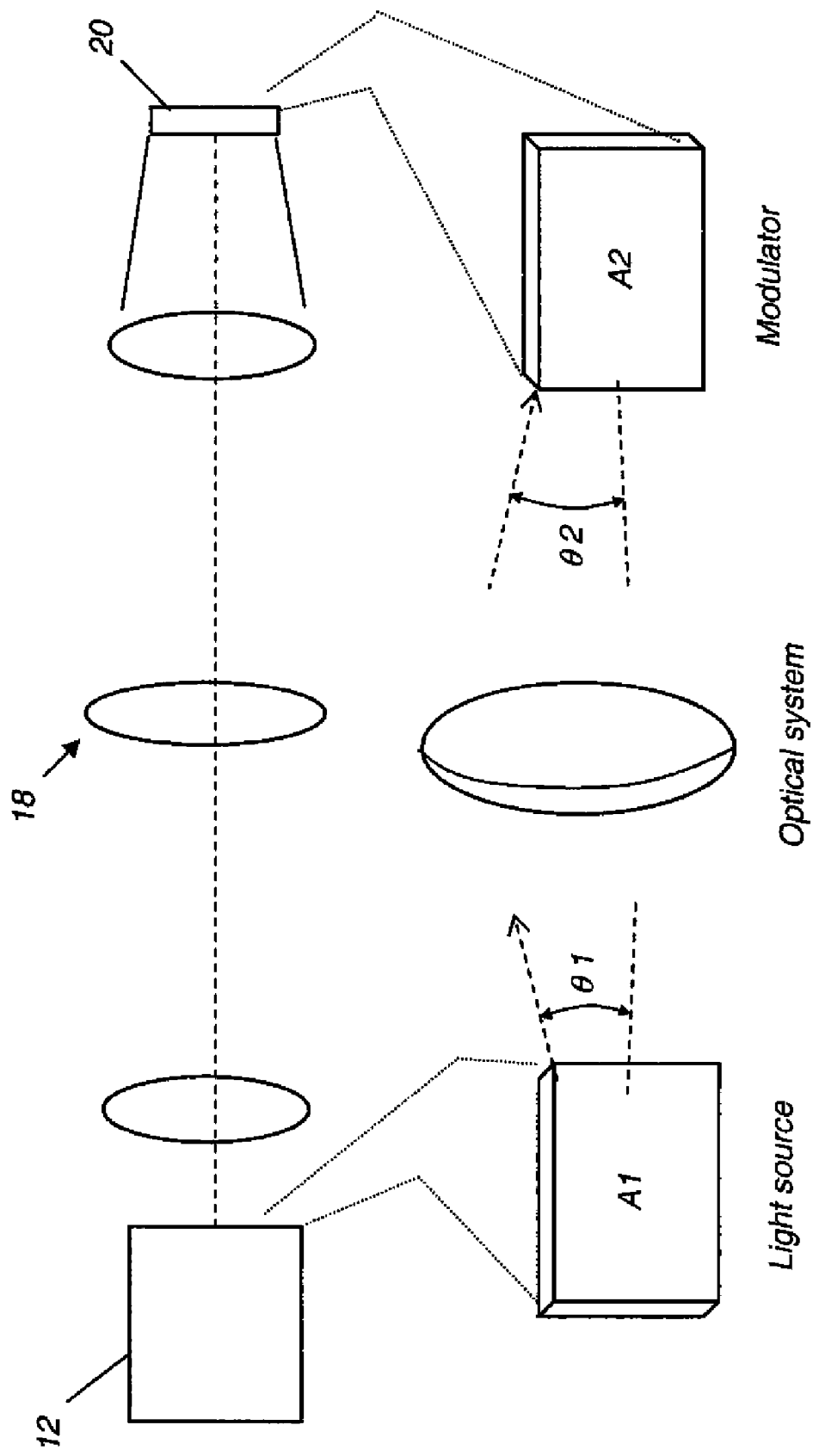
FIG. 2 is a schematic view illustrating etendue matching in an optical system.

In projection display applications it is desirable to utilize lasers because of their purity of spectrum, providing increased color gamut, inherent polarization and most importantly the reduced etendue (angular and spatial extent of the sources). FIG. 2 describes etendue matching in an optical system. Light source 12 has a defined angular and spatial extent (etendue). In order to utilize this light efficiently, optics 18 must deliver the light to the light modulator 20 such that the etendue matches. If the etendue is not matched, either light will be lost, or the complexity of the optics will be unnecessarily increased. The reduced etendue of lasers enables optical components, optical modulators, and optical coatings to function over less angular range. This generally enhances the optical efficiency and contrast ratio of the display. Additionally, these reduced requirements simplify the optical elements, thereby substantially reducing the cost and complexity of the system. Laser coherence (the property of light waves having a particular phase signature), tends to be detrimental to creation of quality images. Interference between beams of relative phase causes unwanted intensity structure. Single coherent lasers impinging upon optical defect structures in an optical system lead to random interference patterns known as speckle. Therefore, it is well understood that using multiple laser sources of independent phase parameters is advantaged in that the combination of these sources reduces the inherent phase of the combined beam. This essentially creates a measure of incoherence, thereby reducing the speckle. Increasing the number of lasers decreases the phase structure and further reduces the speckle creation. While the use of multiple lasers tends to reduce the general coherence of the lasers to substantially reduce speckle, there can be residual coherence, especially in the case of small screens where fewer lasers are used.

According to the present invention, speckle is substantially eliminated by means of three stages of speckle reduction. The first stage of speckle reduction utilizes the far-field illumination of a multiple laser light source which combines angular, spatial, and diffractive mixing of the laser beams along with the independent phase relationships of the laser sources. The second stage of speckle reduction is to direct the far field illumination into a polarization maintaining optical integrator. The third stage of speckle reduction uses a temporally varying optical phase shifting device.

Figure 3:
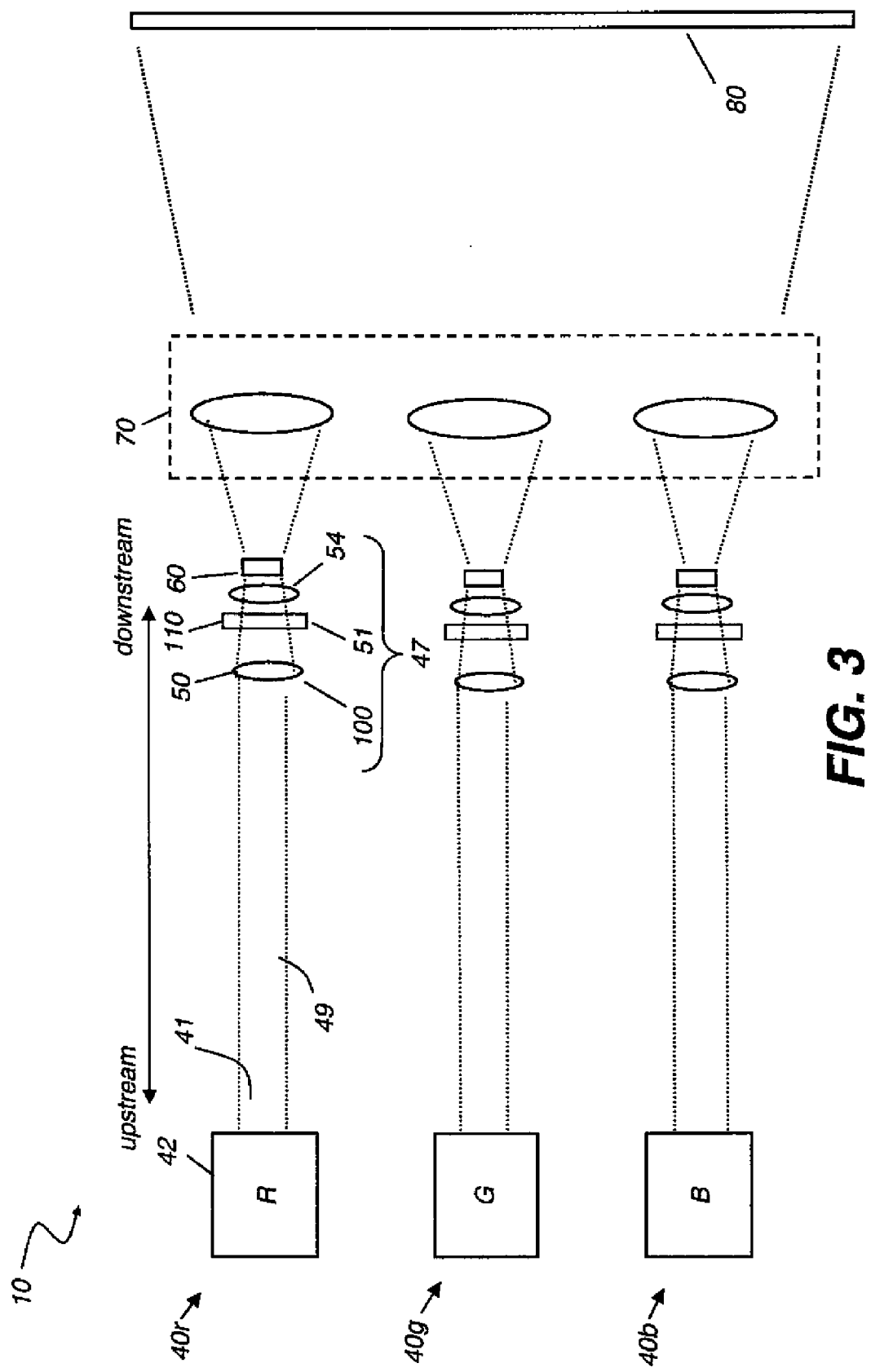
FIG. 3 is a schematic block diagram showing the general arrangement of a projection apparatus using an illumination combiner for stereo image projection that incorporate the present invention.
Figure 10:
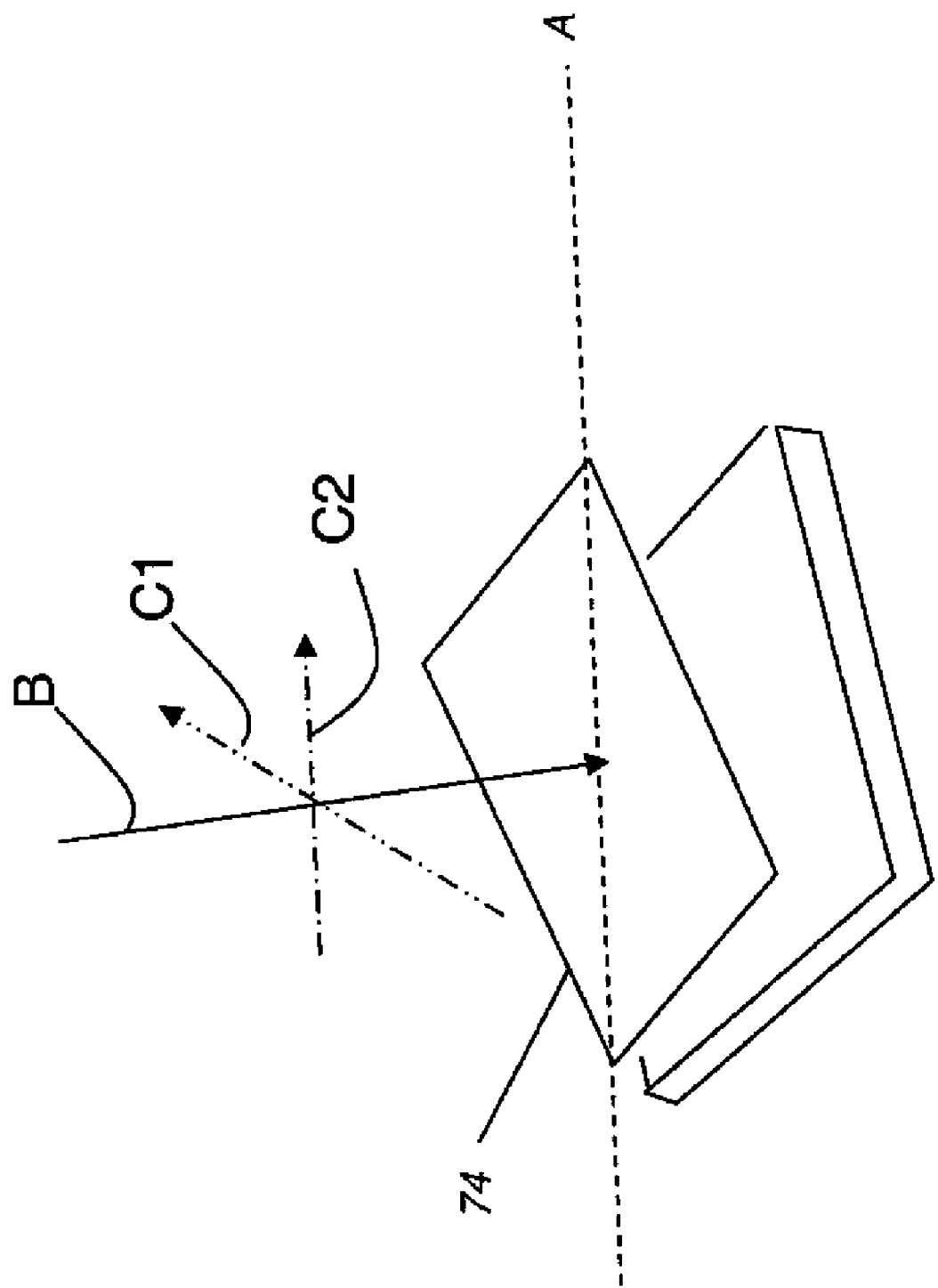
FIG. 10 is a perspective view showing a single pixel modulator and its axis of rotation.

In order to better understand the present invention, it is instructive to describe the overall context within which apparatus and methods of the present invention can be operable. The schematic diagram of FIG. 3 shows a basic arrangement for projection apparatus 10 that incorporates an embodiment of the present invention. Three light modulation assemblies 40r, 40g, and 40b are shown, each projecting light 41 of one of the primary Red, Green, or Blue (RGB) colors along a light path 49 from a laser based illumination combiner 42, which may include one or more laser array light sources (44 in FIG. 4, e.g.). Each projected light 41 has a far field illumination 100 in a far field illumination portion 47 of the light path 41 and is directed by an optional lens 50 through a temporally varying optical phase shifting device 110 (to be described more fully below) and then through a polarization maintaining optical integrator 51, such as lenslet arrays. This light is relayed by lens 54 to a light modulator 60. Light modulator 60 is a micro-electromechanical systems (MEMS) device, an LCD (Liquid Crystal Device) or any other type of optical modulation component. For simplification purposes the exemplary embodiment described will use a MEMS spatial light modulator, where the devices can be considered as "polarization state neutral". This means that the device does not modulate light at each pixel by modulating the polarization state of the pixel. Any change to the polarization state of the incident light for any pixel is inadvertent, and a function of its incident angle when reflected from the MEMS surfaces for that pixel. The incident angle of light (arrow B) to the MEMS spatial light modulator can be adjusted to minimize any unwanted polarization effects as shown in FIG. 10 by orienting the input and output polarization state either in plane or orthogonal to the plane of the micromirror 74. For this embodiment the modulator must take light of two orthogonal input polarization states (arrows C1 and C2) and output light of two orthogonal polarization states that correspond to the respective input states. The output polarization states may, however, be rotated with respect to the input states.

Most Micro-Electromechanical Structures (MEMS) such as DLP devices use a metallic reflector, typically formed from aluminum. Metal mirrors create very small phase shifts upon reflection when handling light from a skew angle. The preferred polarization orientation, where the DLP device maintains the polarization state after reflection, has the polarization axis either in line with (arrow C1) or orthogonal to (arrow C2) the hinge pivot tilt of the micro-mirror, as shown in FIG. 10. Axis A indicates the hinge pivot line for a DLP micromirror. Polarization states oriented along other axes with regard to the plane of the micro-mirror can be used with minimal effect to the residual polarization, however.

A modification to the current DLP package would be required regarding the cover plate hermetic package. The current package is designed to provide an environmental seal as well as a defect-free surface to prevent scattering from impacting image quality. As such, the process of laser welding and thermally fusing windows into mechanical frames induces significant and inconsistent birefringence into each package. Variations in retardance of over 3 nm have been observed across sample devices. This would negatively impact the maintenance of the polarization state out of the device. Therefore new window packaging would be useful in order to properly utilize DLP devices with polarized light. Packages can be improved by utilizing a glass that has a low coefficient stress or thermally induced birefringence, such as SF57 glass. An alternate approach would be to provide stress free mounting of a window to the window frame, for example using RTV bonding material to bond the window in place. Further isolation would be desired such that the mechanics of the window frame are rigid with respect to the window, but flexible with respect to the bonding surfaces to the chip frame. Likewise, this approach could be reversed. Further, it would benefit the procedure for bonding the window to the frame and the frame to the chip mounting if performed at the carefully controlled chip operational temperatures, so as to avoid stresses from an operational and packaging temperature difference.

The use of polarized laser light sources configured to project light having a common polarization axis offers significant advantages for the projection of stereoscopic imagery. The efficiency gains over the conventional illumination sources discussed earlier allow the projector to more easily deliver images with brightness that is comparable with that of conventional 2D projection.

Projection optics 70, indicated generally in a dashed outline in FIG. 3 due to its many possible embodiments, then direct the modulated light to a display surface 80. The overall arrangement shown in FIG. 3 is then used for subsequent embodiments of the present invention, with various arrangements used for illumination combiner 42. Light modulation assemblies 40*r*, 40*g*, and 40*b* then deliver polarized light to a polarization state neutral light modulator 60 and subsequently to projection lens 70.

Figure 4:
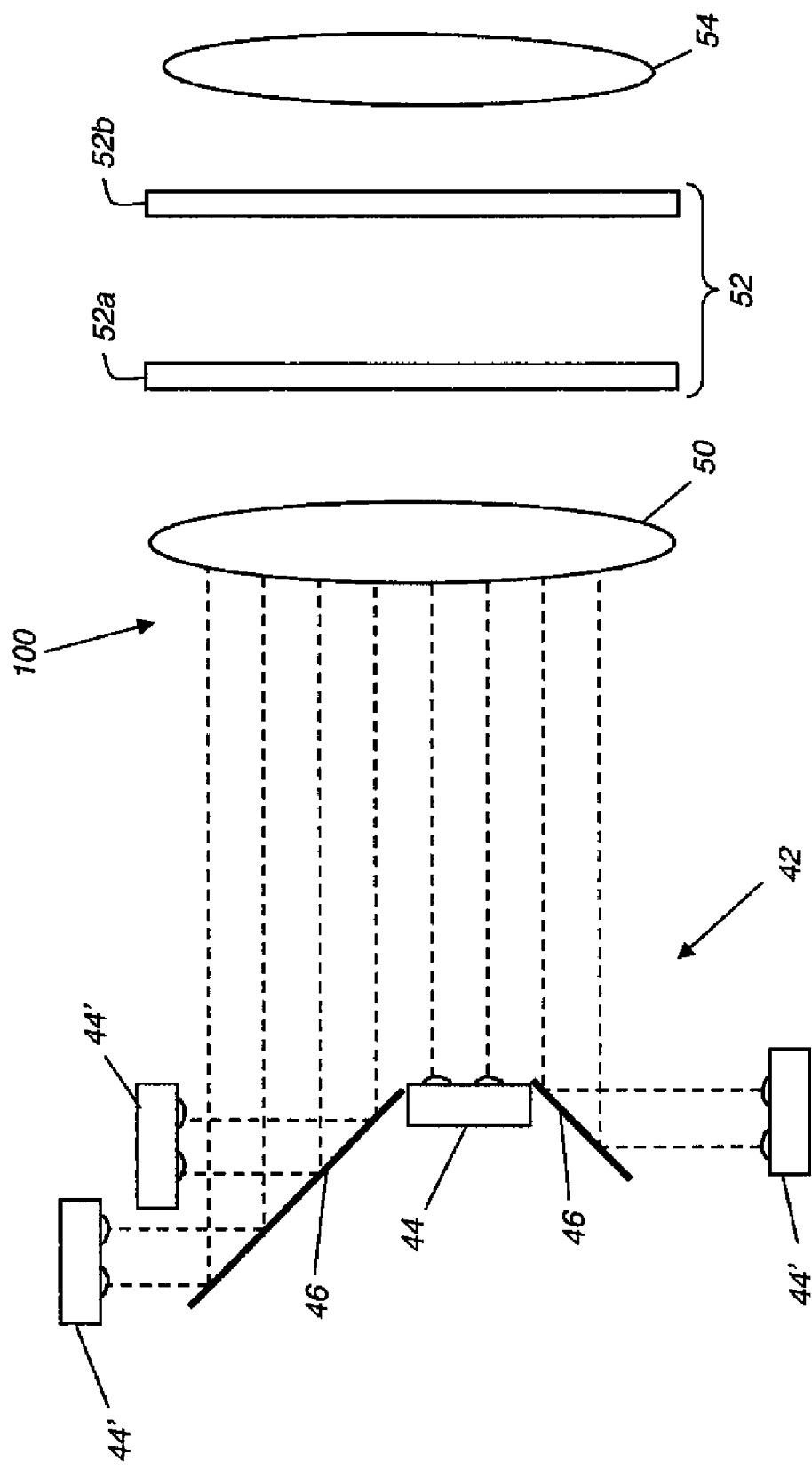
FIG. 4 is a schematic view showing one approach for combining multiple light arrays to form a larger array.

FIG. 4 shows one approach for combining multiple arrays 44 and 44' to form a larger array. In FIG. 4, one or more interspersed mirrors 46 may be used to place the optical axis of additional arrays 44' in line with array 44. However, it can be appreciated that heat and spacing requirements may limit how many arrays 44 can be stacked in this manner. Optically it is desirable to have the lasers combined into the smallest spatial and angular combination so as to reduce the etendue and simplify the optical system.

In typical laser optical projection display designs, the combined laser arrays would be focused either into an optical integrating bar or waveguide. The near-field or Fresnel condition combined light would be focused down to a smaller source by lens 50, then be further mixed both spatially and angularly by this method. The combined light source would be kept relatively small in this manner as the divergence of the lasers is typically small, thus reducing the size of the focusing optic and the integration optic to simplify packaging and reducing the cost. This approach is desirable to reduce laser speckle under most circumstances as the integrating bar or optical waveguide (for example an optical fiber) reduces coherence by mixing polarization, phase, angles and spatial content independently. This approach, however, is not desirable in the case where it is preferred to maintain the polarization states of the lasers. Common optical fibers and integrating bars do not inherently maintain the polarization states of the light. Additionally, this approach does not take advantage of the inherent nature of the laser beam propagation; i.e., lasers in general will stabilize their diffractive output pattern as the distance from emission point is increased. This Fraunhofer or far-field diffraction state provides a controllable position in space where the structure of the laser intensity no longer varies; only the size of the pattern will change. This control is helpful to insure a consistent speckle reduction amount.

Figure 7:
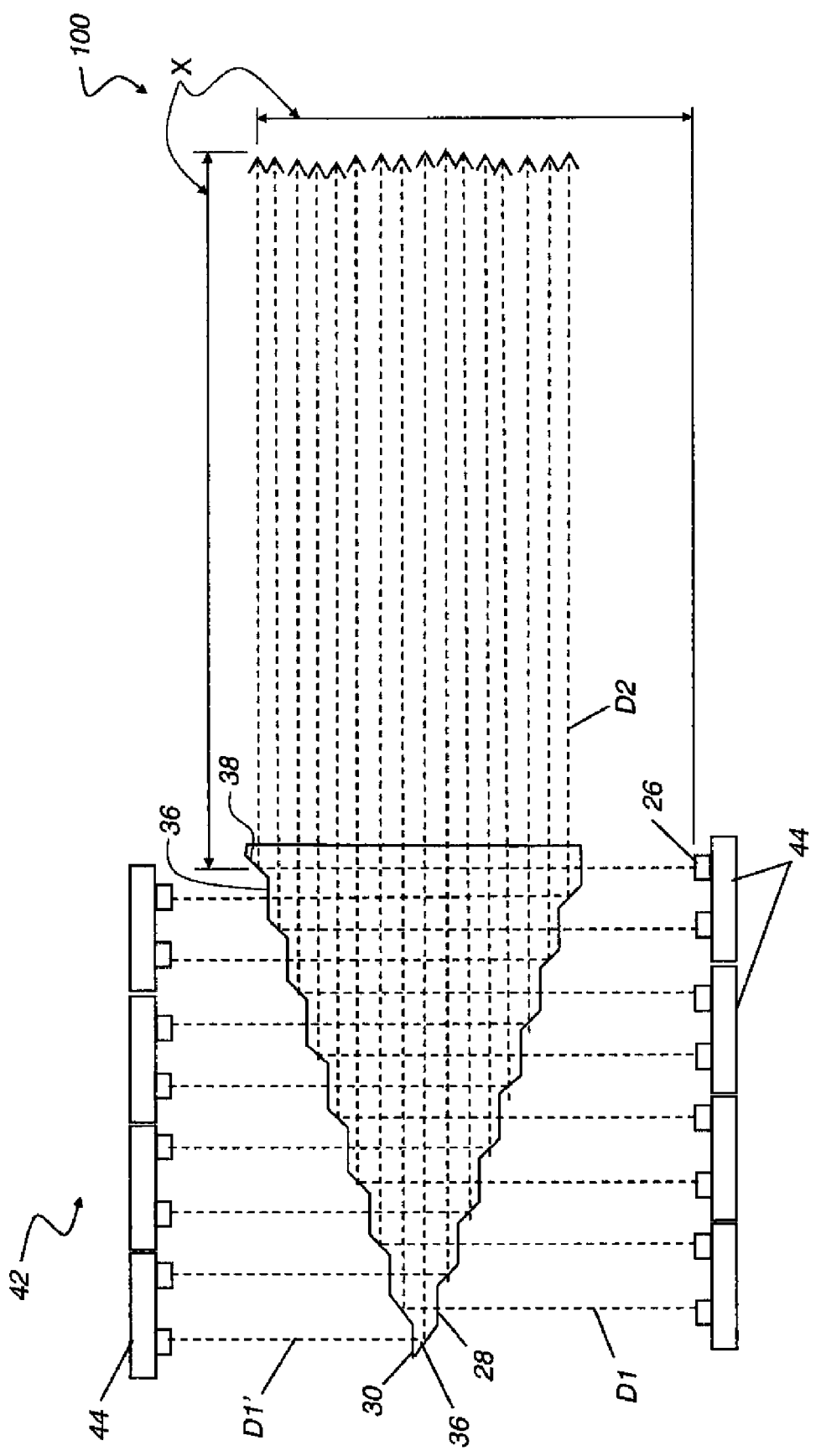
FIG. 7 is a schematic side view showing the use of an embodiment of a light-redirecting prism that accepts light from both sides.

FIG. 7 depicts an alternate embodiment of a laser combiner where the far-field position 100 in the optical path from the laser sources is utilized. The optical paths designated as the combined path length x, from each of the lasers, substantially meets this far field criteria. Utilizing this stable diffraction pattern of illumination in conjunction with the inherent small laser divergence of each source in an array as well as the expected normal variations in pointing angles between particular devices or lines of devices from manufacturing tolerances, provides for an intrinsic pseudo-Gaussian far field image. For example, the un-adapted NECSEL (Novalux Extended Cavity Surface Emmiting Lasers) array of 14 lasers has been shown to have a far field circular Gaussian beam profile of approximately 2 cm in the main beam at approximately 24 inches away from the source. According to the present invention, utilizing the far-field illumination of the lasers provides an inherent first stage of speckle reduction by a combination of angular, spatial, and diffractive mixing of the laser beams along with the independent phase relationships of each of the sources. While this far-field distance is large relative to the common near-field usage for a typical projection system, it is possible to fold this path to reduce the overall package size. Lasers from each of the different color paths may also have their propagation paths overlapping to utilize the air space more effectively. Additionally, in high power digital cinema applications, a small package size is not a critical requirement, whereas this longer distance provides an advantage of creating a substantial thermal barrier between the heat prone laser sources and the heat sensitive optical imaging section of the display system.

The second stage of speckle reduction is to direct the far field illumination into a polarization maintaining optical integrator. LCD projectors commonly utilize lenslet arrays or "fly's eyes" for this function. Unlike integrating bars or rods, no polarization scrambling reflections are utilized in a lenslet integrator 52 as shown in FIG. 4. The lenslet integrator 52 is just one example of the optical integrator 51 shown in FIG. 3. The lenslet integrator is usually made up of two lenslet arrays 52a and 52b, where the first lenslet array 52a is made up of multiple lens elements in the aspect ratio of the illuminated device (optical modulator). The first lenslet array 52a is illuminated with the far-field illumination of the laser source 42. Optional lens 50 may be used to angularly manage the light into the first lenslet array 52a, which is typically nearly collimated light. The first lenslet array 52a images the light onto the second lenslet array 52b. In this manner the second lenslet array 52b acts as a field lens in conjunction with lens 54 and images each of the lens in the first lenslet array 52b onto the optical modulator 60 in an overlapping fashion. The more lenses in the array, the more mixing and uniformity of the output illumination, although more lenses translate to optical losses due to the imperfect nature of the lenslet array. In this second stage of speckle reduction, the illumination hitting the optical modulator 60, unlike the input illumination, is more generally spatially mixed, substantially uniform and in the correct aspect ratio.

Figure 5A:
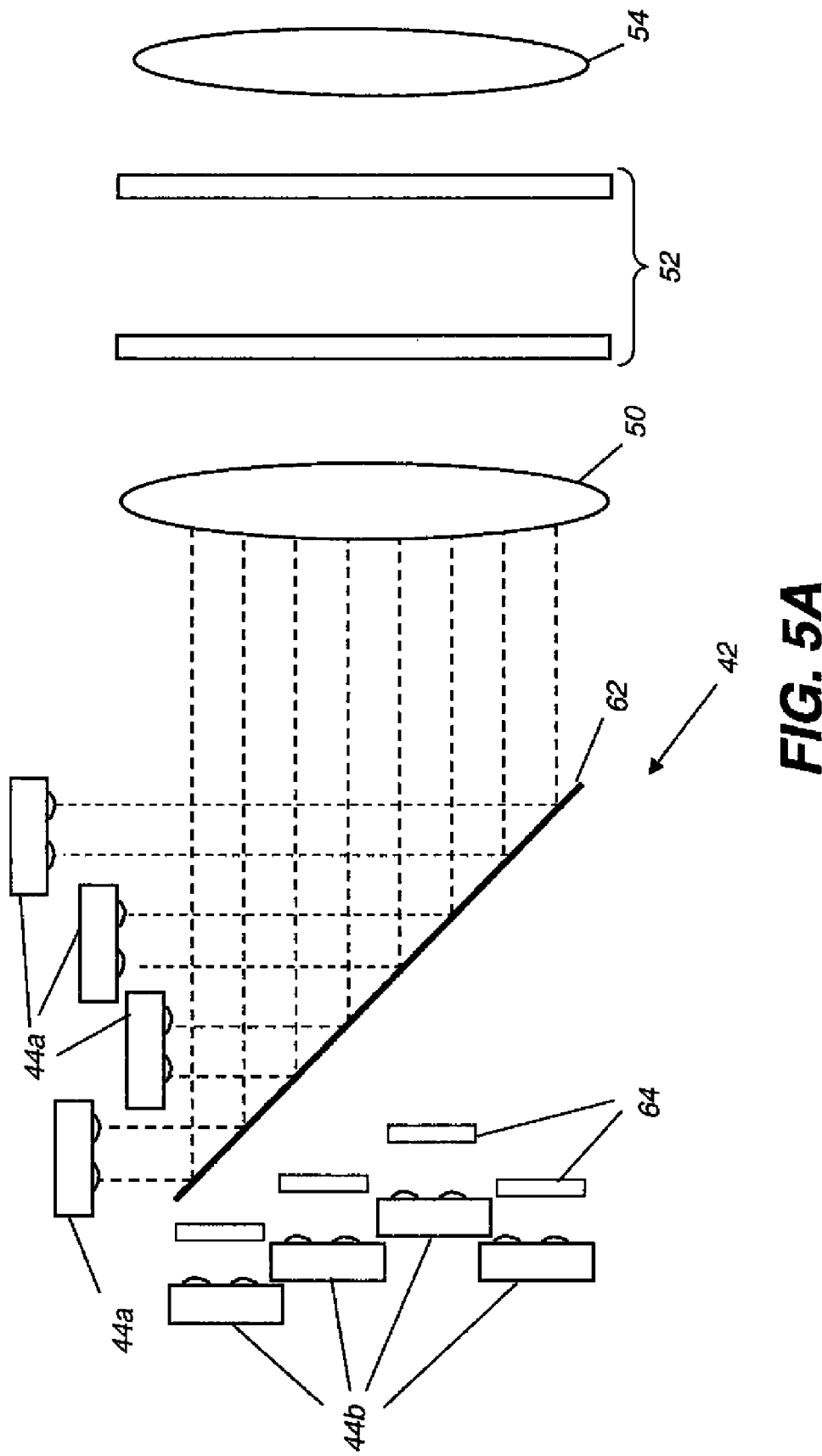
FIGS. 5A and 5B are schematic block diagrams showing projection apparatus that uses polarized light having different polarization states.
Figure 5B:
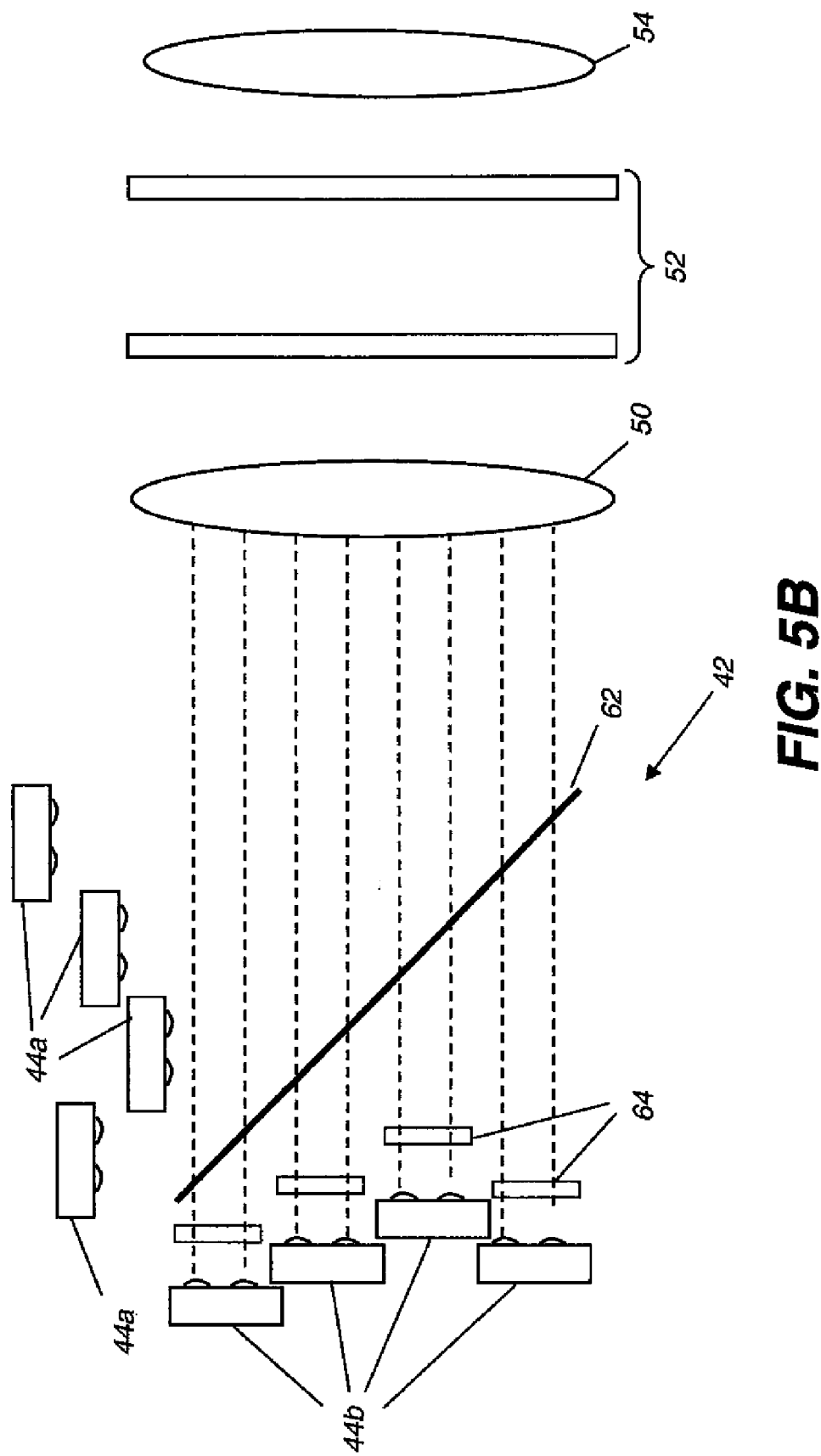

The arrangements shown in FIG. 4 can be modified somewhat to allow the use of polarized light having different polarization states, as shown in FIGS. 5A and 5B. Any one of light modulation assemblies 40r, 40g, and 40b can be rapidly alternated between two orthogonal polarization states to provide left- and right-eye images for stereoscopic viewing. Here there are two banks of polarized lasers. For this example, solid state laser arrays 44a and 44b are used. Polarized laser arrays 44a and 44b provide light of orthogonal polarization states, such as using half wave plates 64 for one of these banks of arrays 44b. In one half of the alternating illumination cycle, arrays 44a are energized, as shown in FIG. 5A. This light reflects from a polarization beamsplitter 62. In the other half of the alternating illumination cycle, arrays 44b are energized, as shown in FIG. 5B. This light is transmitted through polarization beamsplitter 62. For non-stereoscopic applications, the light from both polarized lasers 44a and 44b may be used together to provide a brighter image, or used at half power to balance the lifetime each laser source.

This arrangement advantageously puts light of either polarization onto the same illumination axis. The etendue using this approach remains the same as shown in the configuration shown earlier for a single channel in FIG. 4. Therefore, in non-stereoscopic applications, where both polarization states are imaged, the brightness of the source effectively doubles. However, in the case where stereo display is desired, only a single source is utilized at one particular moment in time, so that the effective brightness remains the same as in FIG. 4. While this arrangement is preferred for its simplicity and provides alternating orthogonal polarization states to the spatial light modulator 60 (FIG. 3), it requires that the lasers operate consistently over the frequency range needed, in order to have each orthogonal combined laser array turn on and off. For digital cinema applications, this is currently at either 120 hz or 144 hz depending on the setup. Many lasers, however, may exhibit thermal stabilization difficulties, thereby causing unstable power fluctuations in this frequency domain. Therefore, in some cases it is required to indirectly (that is, not through source modulation) alternate the orthogonal state of the light before reaching the modulator or to alter this state subsequently after the modulators.

Figure 6:
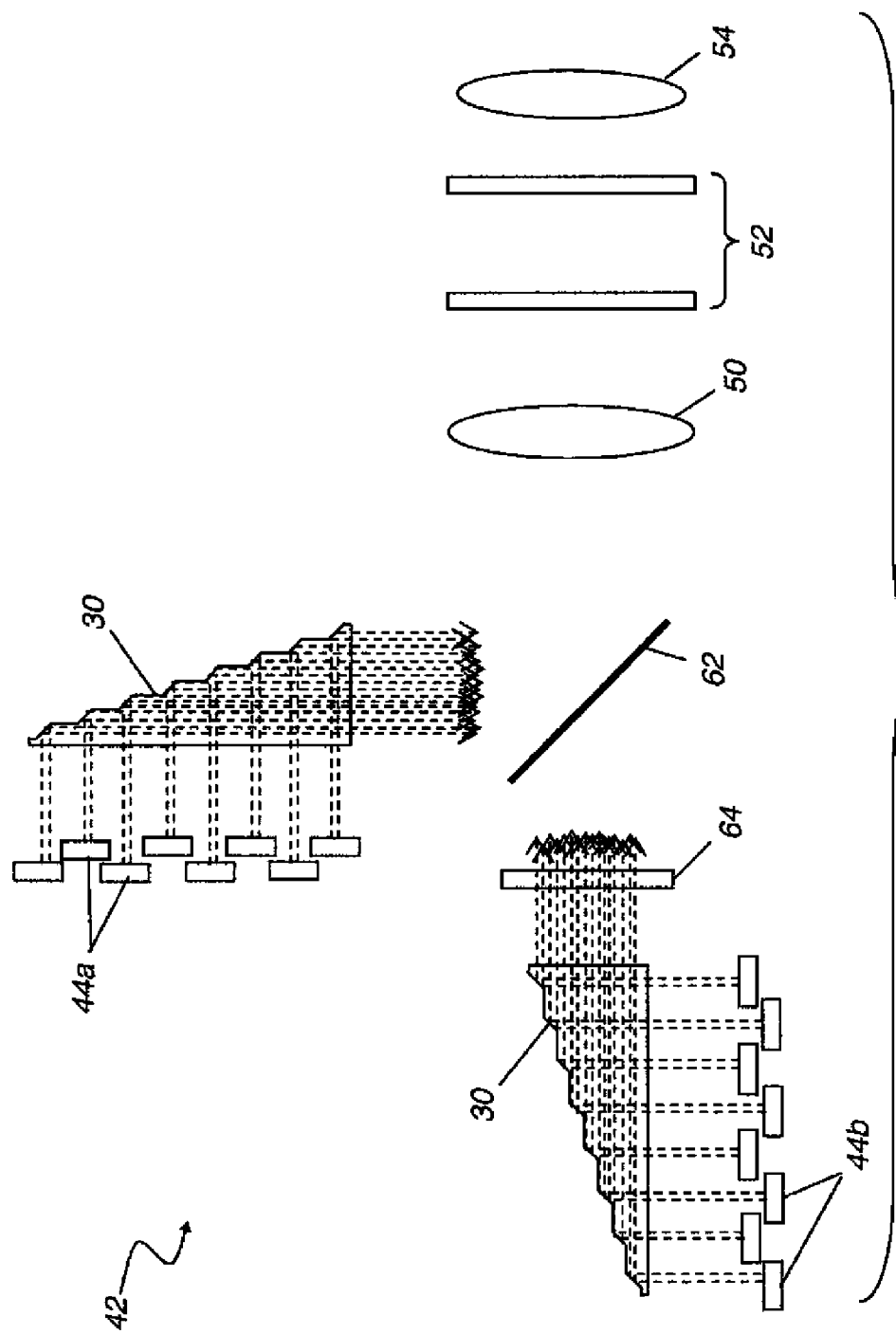
FIG. 6 is a schematic side view showing the use of two light-redirecting prisms, each providing light from laser light arrays, each having different polarization.

The schematic block diagram of FIG. 6 shows how multiple light redirecting prisms 30 can be utilized to provide increased brightness in an embodiment that uses alternating polarization states. As was described earlier with reference to FIGS. 5A and 5B, alternating illumination from light arrays 44a and 44b, through polarization beamsplitter 62, directs light of orthogonal polarization states to spatial light modulator 60 for providing a stereoscopic image.

Figure 8:
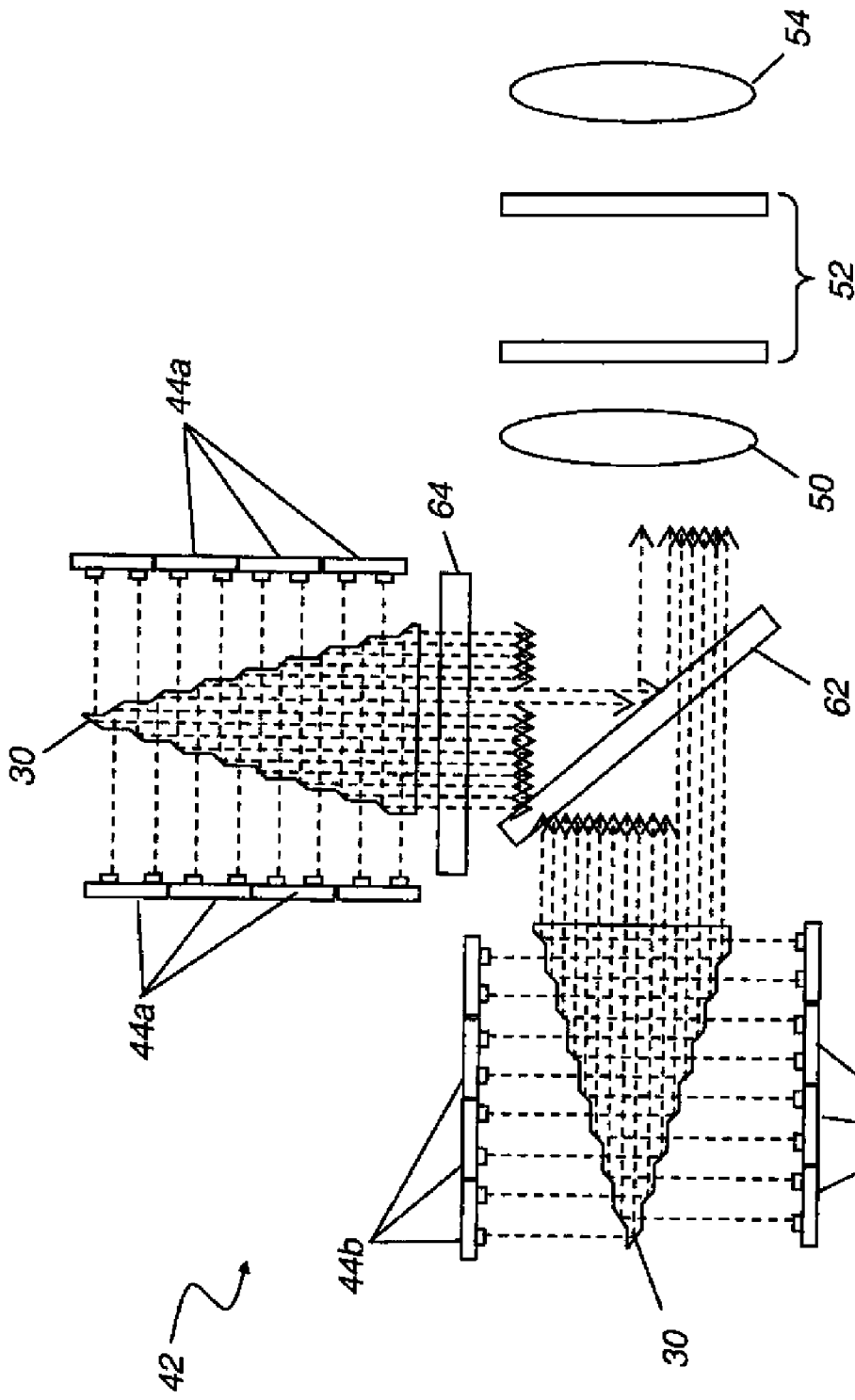
FIG. 8 is a schematic side view of an illumination apparatus using a light-redirecting prism of FIG. 7 for light of each polarization.

The cross-sectional side view of FIG. 7 shows another embodiment of light-redirecting prism 30 in illumination combiner 42 that provides an even more compact arrangement of illumination using laser arrays than the embodiment shown in FIGS. 5A and 6. In this embodiment, light redirecting prism has two redirection surfaces 36, accepting light from arrays 44 that are facing each other, with opposing emission directions D1 and D1'. Each redirection surface 36 has two types of facets: a light-redirecting facet 38 and an incidence facet 28 that is normal to the incident light from the corresponding array 44. This allows for easier alignment of the various laser modules to the light-redirecting prism 30 by retro-reflection of a small residual light from an anti-reflection coated face on facet 28 back into each of the lasers. This retro-reflection can be useful as a means of creating a subtle external cavity that may induce mode instability in the laser. While such mode hopping may be considered noise under typical applications, this noise can add value in projection by further reducing the laser coherence (and inter-laser coherence) thereby reducing visual speckle at the image plane. Additionally, with this dual sided approach, laser modules are interleaved with light from differing modules neighboring each other, providing a source of further spatial mixing when the light is optically integrated further in the optical system. This possibly helps to reduce speckle, by creating a random laser noise. This however cannot be relied upon, as a consistent source of speckle reduction so is not included as an official stage. FIG. 8 shows how a pair of prisms 30 (as shown in FIG. 7) can be used to direct light of orthogonal polarization states toward lens 50 from beamsplitter 62.

While it can be seen that this orientation of the prism 30 to laser 44 is preferred, normal incidence light with respect to the input or output faces is not required for combining the illumination sources. It is required, however, that the redirected light beams exiting the prism 30 at surface(s) 38 be substantially parallel to each other. Achieving this requires careful consideration of a number of factors. These factors include the combination of the angle of incidence of the lasers 44 on each side (as they may be different) to input facets on each side and the refraction in the prism based on the index of refraction of the material. In addition, the reflection off of the redirecting facets from each side (again, these may be different on each side) must be considered and its combination with the refraction of the prism must cooperate so that output light beams from the exit face(s) are in parallel.

Figure 9:
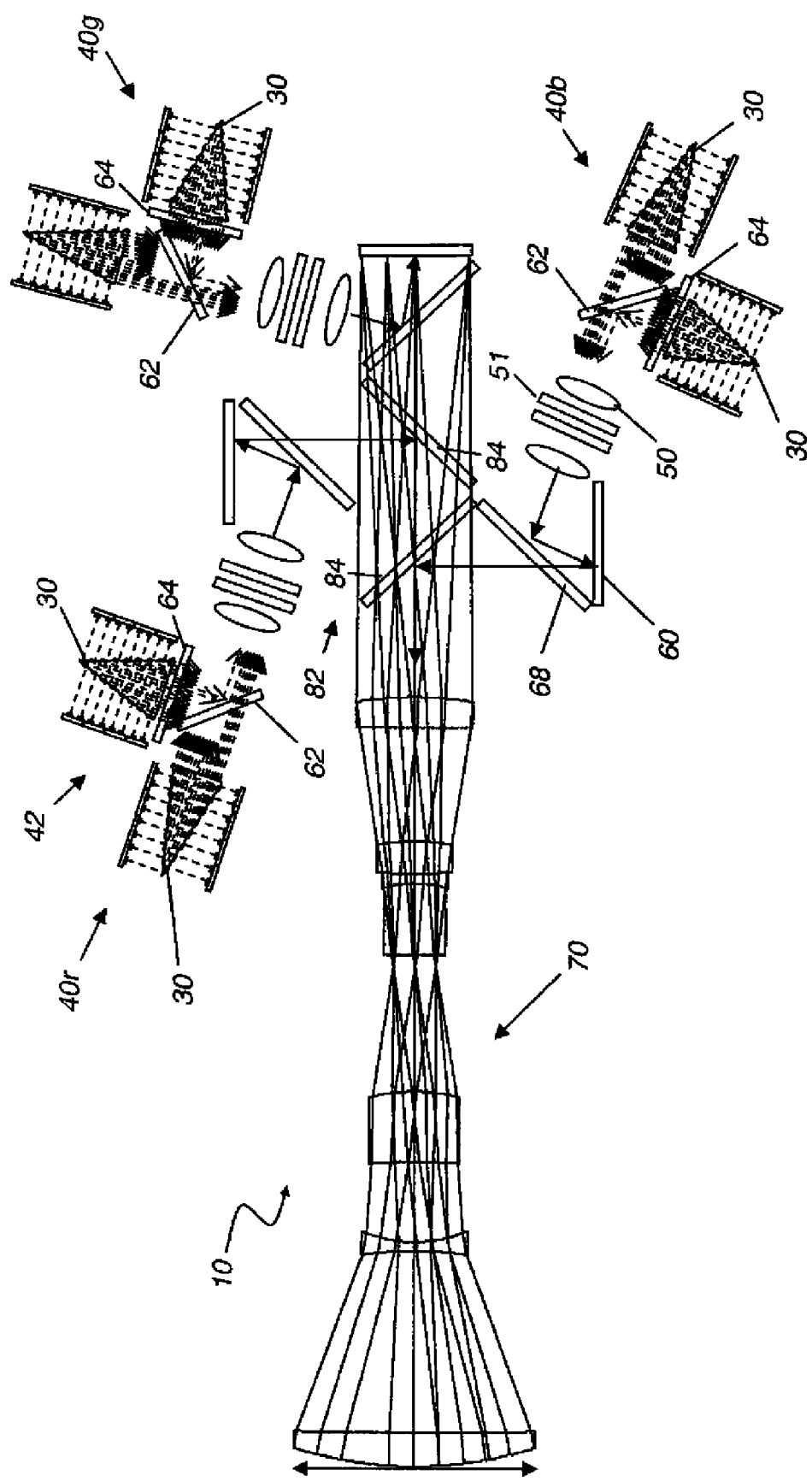
FIG. 9 is a schematic diagram of an alternate projection apparatus using polarized illumination with the light-redirecting prisms of FIG. 7, without light guides.

The schematic block diagram of FIG. 9 shows an embodiment of projector apparatus 10 that uses light-redirecting prisms 30 in each color channel. Each light modulation assembly 40r, 40g, and 40b has a pair of light redirecting prisms 30 with a similar arrangement of polarization-directing components as that described for FIG. 8. In each light modulation assembly, polarized light from one or the other light redirecting prism 30 is directed to lens 50 and optical integrator 51 through polarization beamsplitter 62. Spatial light modulator 60 is a digital micromirror or other MEMS device which modulates light while maintaining two orthogonal orientations of output light related to the orthogonal orientations of the input light. In the embodiment shown, designed to use the angular modulation of a micromirror device, thin film coated surface 68 is treated to reflect or transmit incident light according to its incident angle, so that modulated light is directed to a dichroic combiner 82. Dichroic combiner 82 has an arrangement of dichroic surfaces 84 that selectively reflect or transmit light according to wavelength, combining the modulated light from each light modulation assembly 40r, 40g, and 40b onto a single optical path through projection optics 70. For such an embodiment, lenslet arrays would offer advantages for uniformizing the illumination, since polarization states are maintained.

The present invention allows a number of variations from the exemplary embodiments described herein. For example, a variety of polarized laser light sources could be used as alternatives to VECSEL and other laser arrays. Light directing prism 30 can be made from many highly transmissive materials. For low power applications, plastics may be chosen. For higher power application, glass may be more appropriate.

Figure 11:
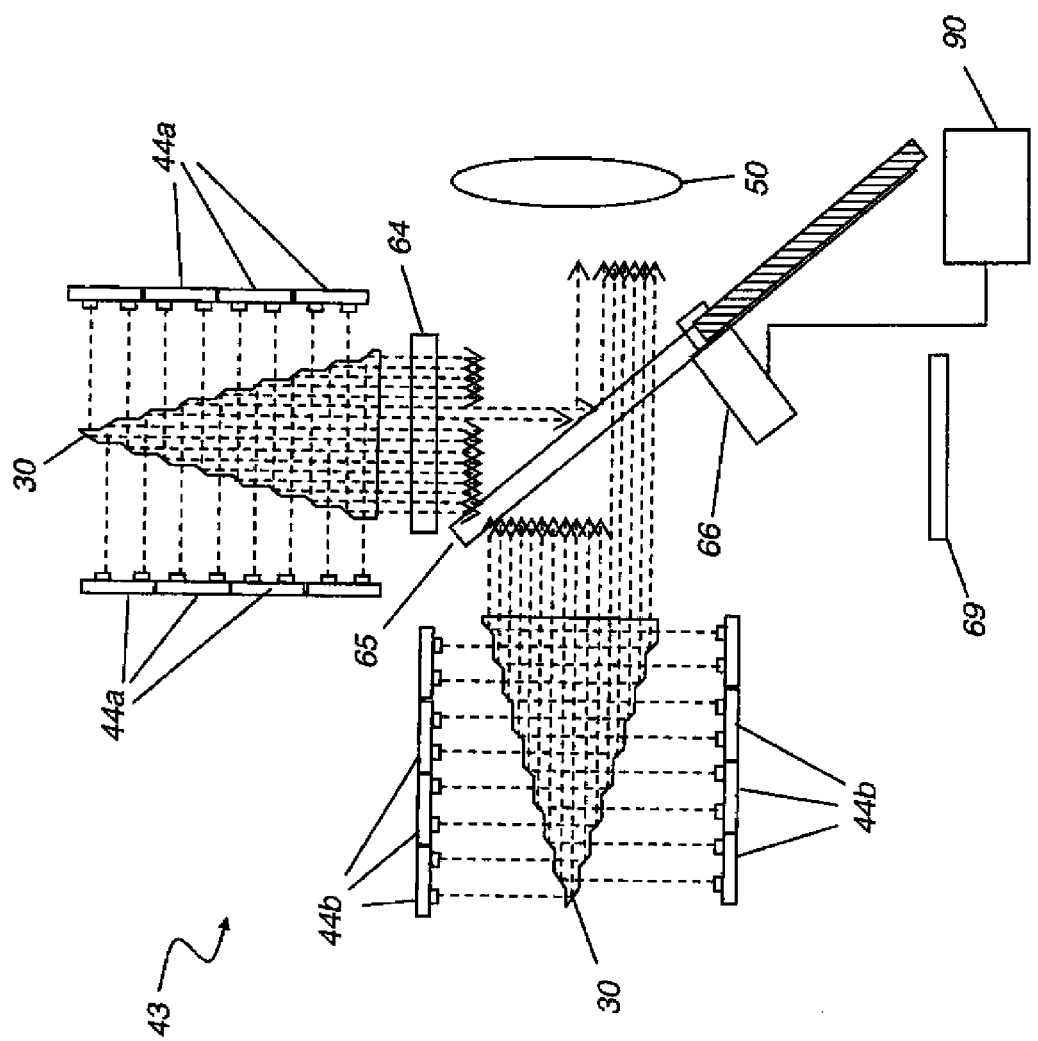
FIG. 11 is a schematic diagram of a shutter system alternately selecting light of each orthogonal polarization.

One reason for maintaining the polarization states of the lasers is to utilize polarization to generate a simulated 3D image, where each eye is imaged an orthogonal state of polarization that is selectively delivered through polarization filtering glasses. One way of creating orthogonal polarizations in order to generate a stereoscopic viewing experience is to mechanically shutter between the two orthogonal states of the combined laser assemblies, as shown in FIG. 11. In an illumination combiner 43, lasers 44b are combined to generate a linear polarization state, i.e., a common polarization axis, while lasers 44a in conjunction with ½ waveplate 64 form light of a linear polarization state that is orthogonal to those of 44b. A polarization rotator, which may be a rotating shutter 65, is placed in the path of the optical axis merged between the orthogonal polarization states. The position of rotating shutter 65 is controlled by a control logic processor 90, e.g., a synchronizing device, that controls a motor 66 to synchronize the polarization rotator with image data. The rotating shutter 65 and the motor 66 provide just one example of the temporally varying optical phase shifting device 110 in FIG. 3.

Rotating shutter 65, shown in plan and side views respectively in FIGS. 12A and 12B, preferably has a glass disk with a least two segments. A first segment 65a is designed to substantially transmit all of the light that is incident upon it. The alternate segment 65b is designed to substantially reflect all of the light that is incident upon it. When transmission segment 65a lies along the optical axis, lasers 44b transmit through to the system, while lasers 44a are absorbed by a beam dump 69. Alternately, when reflective segment 65b is along the optical axis, light from lasers 44a are reflected through to the system, and light from 44b is directed to beam dump 69. In this manner, light of alternating orthogonal polarizations is delivered to the spatial light modulators to create the stereoscopic images by rotating the shutter 65, actuated by a motor 66, in synchronization with the stereoscopic images on the spatial light modulator. It should be noted that there is a transition region 73 between polarization states, as noted in FIG. 12A. Here, illumination light 67 can be between the two regions 65a and 65b. In this case, polarization of both states is inadvertently delivered to the spatial light modulator. This condition causes crosstalk between the images of the two eyes, also known as ghosting. Some amount of crosstalk may be acceptable. If the crosstalk is excessive, the spatial light modulator may be turned to the off state during this transition period, eliminating the crosstalk at the cost of some lost light. Therefore, it is desirable to minimize this transition region. This can be achieved by either minimizing the spot size of the illumination light or by enlarging the shutter wheel, placing the illumination light as far toward the outer diameter as practical.

While the embodiment of FIG. 18 functions to alternate the polarization states of light directed to the spatial light modulator, over 50% of the light is lost to beam dump 69. This essentially reduces system efficiency to that of conventional approaches.

The third stage of the speckle reduction method utilizes may be implemented, but is not limited to the embodiment shown in FIG. 11. The method entails the use of a device to temporally average a shifted phase, spatial and or angular illumination. This temporally shifting device can be placed in the optical path either before or after the optical integrator. In the preferred embodiment, the device occurs prior to the lenslet arrays. In this way any impact of the device on the end illumination is averaged over the entire spatial area, preventing spatial artifacts in the image. Devices that may be considered for this stage could be a vibrating optical element such as a mirror or plate. Random liquid crystal phase pattern generators or acousto-optic modulators may also be used. In the preferred embodiment a rotating optical element is used such as the rotating shutter 65 in FIG. 11. The rotating optical element may be wedged, diffused, or aberrated. In each case a time varying optical path difference is created in the illumination, which changes the residual speckle again without a required depolarization. This occurs over a period during which the eye is able to average out. Phase shifting can be induced by changing the optical path of the beam. Rotating wedged optics does this by inducing a fixed spatial distance change spatially along the optical path. To elaborate, an aberrated surface, such as a non-flat surface, will shift the optical path in a more random pattern depending on the surface shape. Diffusive surfaces, such as those created by a poor polish or surface etching, will also provide a random phase shift in a more regular fashion. The surface quality will vary the type and amount of phase shift induced. Etched surfaces tend to have a less sharp surface quality and therefore reduce scatter losses from this process. Etched glasses of this type are often referred to as "anti-newton" glass. It is desired to minimize the surface degradations and therefore the phase induced, as there will be some light loss associated with this approach.

This rotating optical element, e.g., rotating shutter 65, may be subsequently utilized to help create alternating orthogonal polarization states. This in turn can be used to create stereoscopic images. The temporal frequency that is acceptable to create stereoscopic images is likewise fast enough to average out speckle. In either case, from a flicker or speckle reduction method, faster temporal averaging will in general provide fewer artifacts.

Figure 13:
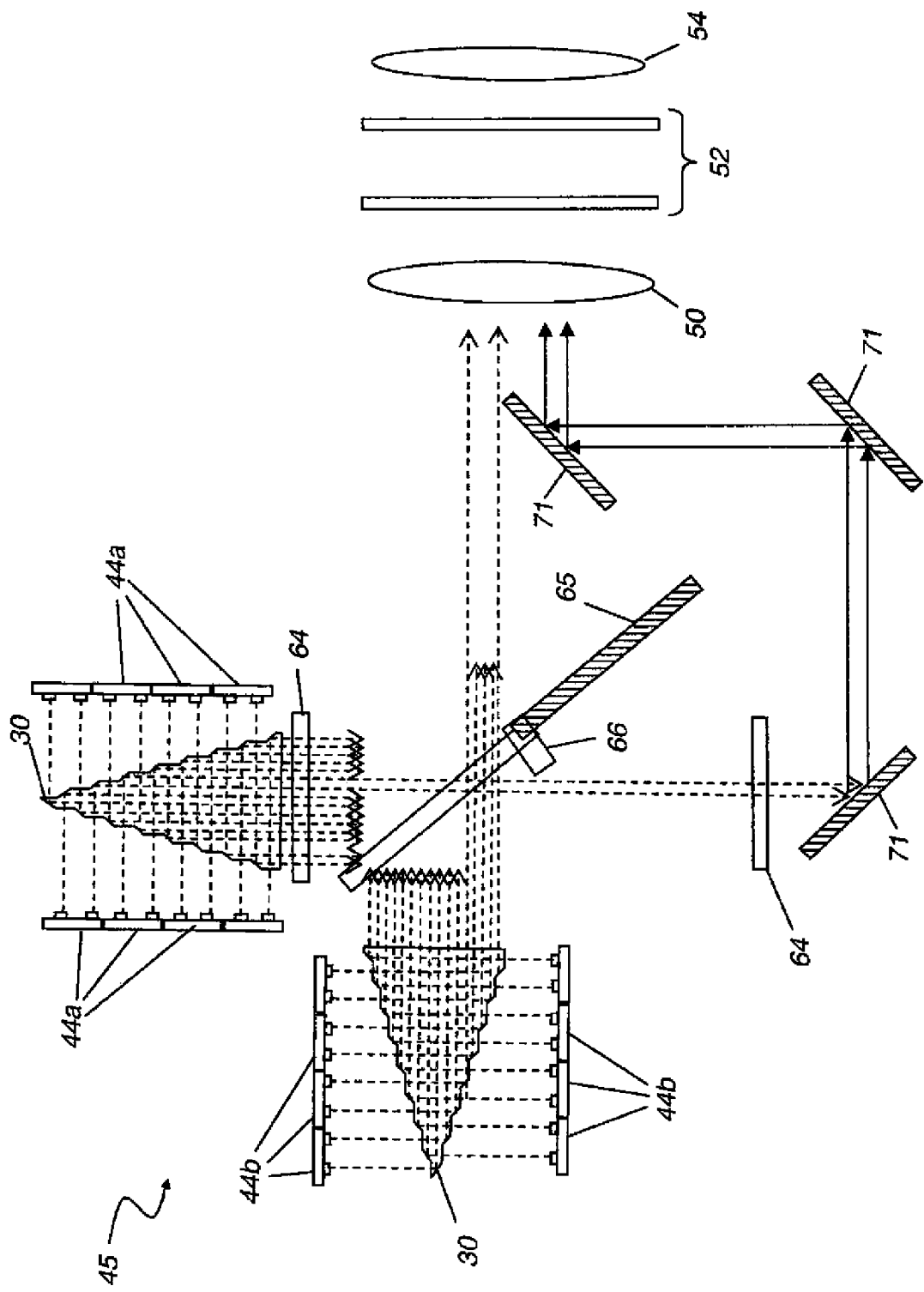
FIG. 13 is a schematic diagram of an embodiment of a recycling illumination system that alternately converts light to two orthogonal polarization states.

This embodiment is shown in FIG. 13 and uses rotating shutter 65 to recover the light that was previously delivered to beam dump 69. In an illumination combiner 45, the light formerly in this path has its polarization state converted by a ½ waveplate 64. The two illumination sources may also be made orthogonal polarization states by simply rotating each of the sources such that the outputs are orthogonal. In either case, this converts the light to the same polarization state that is directly delivered to the spatial light modulator by the rotating shutter 65. This converted light is then directed by mirrors 71 to a path that is adjacent to the light from the rotating shutter 65. The combined light of both laser arrays, now of the same polarization state, is delivered to lenslets 52 and to the spatial light modulator. Again, by rotating shutter 65 using motor 66, light is alternately delivered in orthogonal polarization states.

For the embodiment of FIG. 13, it can be observed that the etendue of the light source has doubled compared with its state as delivered in FIG. 11. This etendue may be provided to the optical integrator 51 with double the area, with the original and converted beams side by side and in the same angular space. Alternately, the light may be provided with some amount of overlap from each laser source. Angular overlapping may be more desirable because it would be easier to achieve a uniform illumination for all pixels by mixing in this space, as the projection lens is typically telecentric. While the optics following the illumination path needs to handle this large etendue in order to be efficient, this is not a very difficult problem due to the nature of the low starting etendue of laser sources.

Figure 14:
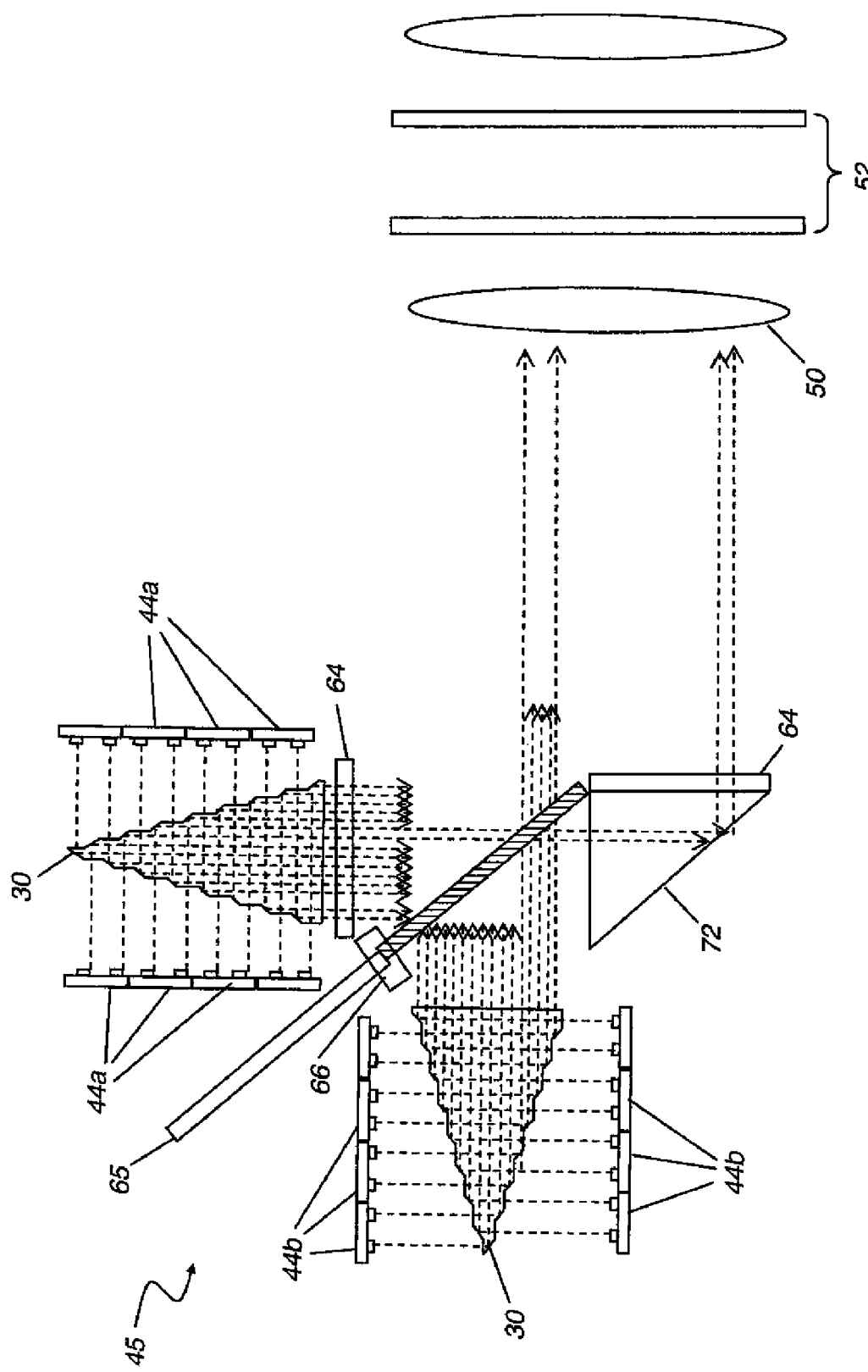
FIG. 14 is an alternate embodiment of the recycling illumination system shown in FIG. 13.

FIG. 14 shows an alternate embodiment that uses this recovered polarized light but requires fewer components. Mirrors 71 shown in FIG. 14 are replaced by prism 72 having a half waveplate 64. Prism 72 is placed in close proximity to rotating shutter 65 to simplify the optical folding and minimize the spacing between the two light paths.

Figure 15:
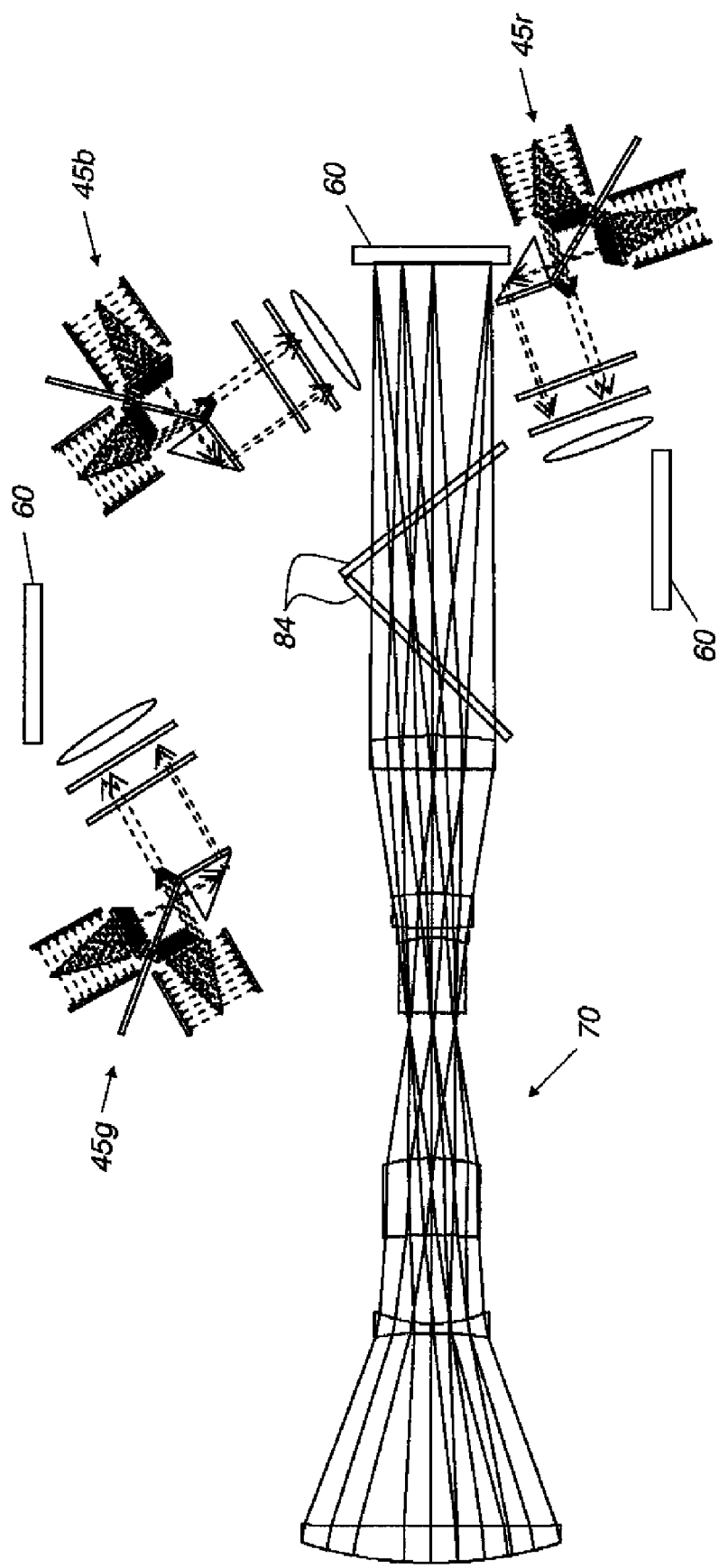
FIG. 15 is a schematic diagram of a stereo projection apparatus using alternating orthogonal polarization states provided by the illumination system described in FIG. 14.

FIG. 15 shows a projection system incorporating the alternating orthogonal polarization illumination systems 45r, 45g, 45b shown in FIG. 15, directly illuminating spatial light modulators 60 in each color channel and recombined with dichroic plates 84 to be projected by lens assembly 70.

This same approach works appropriately for non-stereoscopic projection as well without additional light loss, even during the transition regions. Therefore, unlike conventional solutions, it is not necessary to remove the shutter wheel or polarization switch in order to improve the throughput efficiency for conventional imaging. In this case, motor 66 may be shut down to save on lifetime or power consumption during non-stereoscopic imaging, preferably with the transmissive region of the shutter in the optical path so that unnecessary coating damage and heat buildup can be minimized.

The rotating shutter mechanism of FIGS. 12A and 12B serves as the third speckle reduction function in addition to providing an alternating orthogonal polarization method. A coherence-breaking coating may be applied to one or both sides of the shutter. FIG. 12B shows the rotating shutter 65 with one side 65c fabricated with a ground surface, while the opposite side 65d contains the polished surface with anti-reflection coating in one segment and a mirror coating in the alternate segment. The surface roughness should be high enough to eliminate visual speckle, but low enough to no substantially increase the angular extent of the source. This relatively rough surface, which induces additional diffraction from the effective defects in essence induces random varying high levels of speckle by the rotating wheel (spatial motion) moving the speckle generating points and by temporal averaging appears to have lower speckle. Alternately, as described earlier, both sides 65c and 65d may be polished, however the surfaces may not be optically flat such that multiple waves of optical path difference are induced into the light beams varying at the rotational frequency. This is preferred over a non-polished surface in that it does not substantially increase the angular content of the illumination light and therefore increase the etendue.

Other temporally varying phase shifting devices or means may be used. For example, it is possible to shift or vary in time the position, tilt or position and tilt of an optical element, such as a mirror to create an optical phase shift. Similarly, this shift or tilt may be done to the surface of an optical element. Another embodiment would be to utilize a substantially random adaptive optical surface as such an optical phase shifting device.

An alternative embodiment to utilizing a temporally varying optical phase shifting technique in conjunction with far-field laser illumination combined with optical integration (spatial mixing) is to instead utilize a temporally varying optical etendue shifting device that temporally varies the optical etendue onto the spatial light modulator. In this way, the spatial light illumination is either slightly shifted in angular (magnitude or position), spatial (magnitude or position) or a combination of angular and spatial attributes as opposed to changing the optical path length. This can be achieved by various means, but most simply by using shifted or tilted optical elements to adjust the illumination etendue. Light will also be lost with this method, as it requires an overfilling of either angular or spatial light to account for the temporally shifted etendue. It is important to either maintain the uniformity of the illumination on the spatial light modulator or to temporally shift at a frequency whereby the eye averages the shifted illumination without any flicker. The latter is preferred, as it will have the best results in reducing laser speckle.

The three stage speckle reduction means encompasses the use of combined laser arrays in the far-field, spatially uniformized by a polarization preserving optical integrator such as a lenslet array or integrating bar with minimal optical bounces and temporal averaging of either phase, or etendue (angular, spatial, or both) shifting independently or in combination. Measurements of this technique have been made relative to a white light source. The white light source, a tungsten source optically integrated with lenslet arrays, as is commonly done in digital cinema applications, provides approximately 2% speckle variation on a white model board screen. A green Novalux 3-watt array with 24 lasers frequency doubled to provide 48 beams in the near-field condition has approximately 11% speckle. In the far-field condition the speckle drops to 9%. When optically integrated with lenslet arrays the speckle drops to around 8%. The use of an aberrated or wedged wheel spinning at 500 rpm brings the residual speckle down to 3%. Without the use of the lenslet array this spinning disk has little affect on the speckle. The speckle reduction was found to be unaffected by the location of the spinning optical disk. Additional lasers (approximately 8 to 10 3-watt lasers per color) required to populate a digital cinema projector of 10,000 lumens will provide a significant level of additional speckle reduction as more independently phased lasers further decreases the coherence.

The invention has been described in detail with particular reference to certain preferred embodiments thereof, but it will be understood that variations and modifications can be effected within the spirit and scope of the invention. For example, where laser arrays are described in the detailed embodiments, other laser emissive components could be used as an alternative. Supporting lenses and other optical components may also be added to each optical path. In optical assemblies shown herein, the order of the light integration and relaying can be reversed without significant difference in effect.

PARTS LIST

10. Projector apparatus
12. Light source
14. Prism assembly
16. Position
18. Optics
20. 20r, 20g, 20b. light modulator 26. Laser
28. Incidence facet
30. Light redirecting prism
32. Incident face
34. Output face
36. Redirection surface
38. Light-redirecting facet
40r, 40g, 40b. Light modulation assembly
42. Illumination combiner
43. Illumination combiner with shutter assembly
44, 44', 44a, 44b. Laser light array
45' 45r, 45g, 45b. Illumination combiner
46. Mirror
48, 56. Polarization beamsplitter
50. Lens
51. Optical Integrator
52. Lenslet arrays
52a. First lenslet array
52b. Second lenslet array
54. Lens
60. light modulator
62. Polarization beamsplitter
64. Half wave plate
65. Rotating Shutter
65a. Transparent Segment
65b. Reflective Segment
65c. Diffuse Side
65d. Polished Side (Coated)
66. Motor
67. Output light
68. Dichroic surface
69. Beam dump
70. Projection optics
71. Mirror
72. Reflective prism
73. Transition Region
74. Micromirror
75. Electronic Polarization Rotator
76. Quarter Wave Plate
80. Display surface
82. Dichroic combiner
84. Dichroic surface
90. Control logic processor
100. Far field illumination
110. Temporally varying optical phase shifting device
A. Axis
B. Incident light
C1, C2. Polarization axes
D1, D1'. Emission direction
D2. Output direction
X Far-Field distance

The invention claimed is:

1. A digital image projector comprising:
   a) a light assembly for a particular color channel configured to project light along a light path from at least one laser array light source including multiple lasers, the projected light from the multiple lasers overlapping in a far field illumination portion of the light path to form a combined light beam, the far field illumination portion of the light path being a portion beyond a far field distance wherein a laser intensity pattern from an individual laser satisfies a far field criterion such that only the size of the laser intensity pattern varies and the structure of the laser intensity pattern does not vary;
   b) a temporally varying optical phase shifting device configured to be in the light path downstream from the far field distance;
   c) an optical integrator downstream of the temporally varying optical phase shifting device;
   d) a spatial light modulator located downstream of the optical integrator in the light path, the spatial light modulator; and
   e) projection optics located downstream of the spatial light modulator in the light path, the projection optics configured to direct speckle reduced light from the spatial light modulator toward a display surface.

2. The digital image projector of claim 1, wherein the spatial light modulator comprises a micromirror device or a liquid crystal display based device.

3. The digital image projector of claim 1, wherein at least one of the laser array light sources comprises at least one vertical cavity laser.

4. The digital image projector of claim 1, wherein the temporally varying phase shifting device comprises a rotating element that (a) is optically wedged, (b) is aberrated, (c) has a diffusive surface, or (d) has combinations thereof.

5. The digital image projector of claim 1, wherein the temporally varying phase shifting device comprises a spatially tilted or displaced optical element.

6. The digital image projector of claim 1, wherein the laser array light source is or the laser array light sources are configured to cause the projected light to have a common polarization axis, and wherein the optical integrator is a polarization maintaining optical integrator.

7. The digital image projector of claim 6, wherein the spatial light modulator comprises a micromirror device or a liquid crystal display based device.

8. The digital image projector of claim 6, wherein at least one of the laser array light sources comprises at least one vertical cavity laser.

9. The digital image projector of claim 6, wherein the temporally varying phase shifting device comprises a rotating element that (a) is optically wedged, (b) is aberrated, (c) has a diffusive surface, or (d) has combinations thereof.

10. The digital image projector of claim 6, wherein the temporally varying phase shifting device comprises a spatially tilted or displaced optical element.

11. A stereoscopic digital image projector comprising:
    a) a light assembly configured to project polarized light having a common first polarization state along a light path from at least one laser array light source, the projected polarized light having an overlapping far field illumination in a far field illumination portion of the light path;
    b) a polarization rotator configured to be in the light path of the projected polarized light and actuable to controllably rotate the polarization state of the projected polarized light from the first polarization state to a second polarization state;
    c) a temporally varying optical phase shifting device configured to be in the light path;
    d) a polarization maintaining optical integrator configured to be in the far field portion of the light path;
    e) a micro-electromechanical spatial light modulator located in the light path downstream of the polarization rotator, temporally varying optical phase shifting device, and the optical integrator, the spatial light modulator configured to form a first modulated light from light of the first polarization state and to form a second modulated light from light of the second polarization state;
    f) a synchronizing device configured to synchronize the polarization rotator with image data; and g) projection optics located downstream of the spatial light modulator in the light path, the projection optics configured to direct substantially speckle free light from the spatial light modulator toward a display surface.

12. The stereoscopic digital image projector of claim 11, wherein the spatial light modulator is a micromirror device.

13. The stereoscopic digital image projector of claim 11, wherein the polarization rotator is a segmented disk with at least one reflective segment and at least one transmissive segment.

14. The stereoscopic digital image projector of claim 13, wherein the polarization rotator is the temporally varying phase shifting device.

15. The stereoscopic digital image projector of claim 11, wherein the temporally varying phase shifting device has an optical wedged, aberrated, diffusive surfaced element, or combinations thereof.

16. A digital image projector comprising:
   a) a light assembly for a particular color channel configured to project light along a light path from at least one laser array light source including multiple lasers, the projected light from the multiple lasers overlapping in a far field illumination portion of the light path, the far field illumination portion of the light path being a portion beyond a far field distance wherein a laser intensity pattern from an individual laser satisfies a far field criterion such that only the size of the laser intensity pattern varies and the structure of the laser intensity pattern does not vary;
   b) a temporally varying optical etendue shifting device configured to be in the light path downstream from the far field distance;
   c) an optical integrator downstream of the temporally varying optical phase shifting device;
   d) a spatial light modulator located downstream of the the optical integrator in the light path, the spatial light modulator; and
   e) projection optics located downstream of the spatial light modulator in the light path, the projection optics configured to direct speckle reduced light from the spatial light modulator toward a display surface.

17. The digital image projector of claim 16, wherein the temporally varying optical etendue shifting device is configured to change an angular position, an angular size, or both the angular position and the angular size of the projected light.

18. The digital image projector of claim 16, wherein the temporally varying optical etendue shifting device is configured to change an angular or spatial position, an angular or spatial size, or any combination thereof.

19. The digital image projector of claim 16, wherein the optical integrator is configured to substantially maintain a polarization state of the projected light.

20. A method of reducing laser speckle in a laser displayed image, the method comprising:
   a) projecting light from a laser array light source including multiple lasers in a particular color channel along a light path, the projected light from the multiple lasers overlapping in a far field illumination portion of the light path, the far field illumination portion of the light path being a portion beyond a far field distance wherein a laser intensity pattern from an individual laser satisfies a far field criterion such that only the size of the laser intensity pattern varies and the structure of the laser intensity pattern does not vary;
   b) temporally varying the projected light using a temporally varying optical phase shifting device or a temporally varying optical etendue shifting device configured to be in the light path downstream from the far field distance;
   c) optically integrating the projected light subsequently to temporally varying the projected light;
   d) spatially modulating the projected light subsequently to optically integrating the projected light; and
   e) optically projecting speckle reduced light toward a display surface subsequently to spatially modulating the projected light.

* * * * *